(12) United States Patent
Fernandes et al.

(10) Patent No.: US 10,165,218 B2
(45) Date of Patent: Dec. 25, 2018

(54) DISPLAY POWER REDUCTION USING HISTOGRAM METADATA

(71) Applicant: Samsung Electronics Co., Ltd., Suwon-si, Gyeonggi-do (KR)

(72) Inventors: Felix Carlos Fernandes, Plano, TX (US); Esmaeil Faramarzi, Richardson, TX (US); Xin Li, Dallas, TX (US); Anshuman Tewari, Plano, TX (US); Youngkwon Lim, Allen, TX (US); Sungoh Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 14/332,132

(22) Filed: Jul. 15, 2014

(65) Prior Publication Data

US 2015/0029394 A1 Jan. 29, 2015

Related U.S. Application Data

(60) Provisional application No. 61/858,031, filed on Jul. 24, 2013, provisional application No. 61/893,650, (Continued)

(51) Int. Cl.
*H04N 5/57* (2006.01)
*H04N 9/64* (2006.01)
(Continued)

(52) U.S. Cl.
CPC ............ *H04N 5/57* (2013.01); *G09G 3/3208* (2013.01); *G09G 3/3406* (2013.01); *H04N 9/68* (2013.01);
(Continued)

(58) Field of Classification Search
CPC .......... H04N 5/57; H04N 9/646; H04N 21/84; G09G 3/3208; G09G 2330/021
(Continued)

(56) References Cited

U.S. PATENT DOCUMENTS

2007/0182757 A1* 8/2007 Sankar ............... G06F 3/14
345/617
2007/0183678 A1* 8/2007 Sankar ............... G06F 3/14
382/254

(Continued)

FOREIGN PATENT DOCUMENTS

KR 10-2012-0123788 A 11/2012
KR 10-2012-0127232 A 11/2012
(Continued)

OTHER PUBLICATIONS

International Search Report dated Nov. 5, 2014 in connection with International Patent Application No. PCT/KR2014/006733, 3 pages.
(Continued)

*Primary Examiner* — Zaihan Jiang

(57) ABSTRACT

A method includes identifying an optimal backlight value for at least one quality level of a first video segment. The method also includes transmitting data for the first video segment. The transmitted data for the first video segment includes a message containing a first set of display adaptation information. The first set of display adaptation information includes the optimal backlight value for the at least one quality level of the first video segment. The method further includes identifying a backlight value for the at least one quality level of a second video segment. The method also includes determining a maximum backlight value change threshold between successive video segments. In addition, the method includes applying temporal smoothing
(Continued)

between the optimal backlight value and the backlight value based on the maximum backlight value change threshold.

23 Claims, 7 Drawing Sheets

Related U.S. Application Data filed on Oct. 21, 2013, provisional application No. 61/895,242, filed on Oct. 24, 2013, provisional application No. 61/909,262, filed on Nov. 26, 2013, provisional application No. 61/925,558, filed on Jan. 9, 2014, provisional application No. 61/971,892, filed on Mar. 28, 2014.

(51) Int. Cl.

| | |
|---|---|
| H04N 21/234 | (2011.01) |
| H04N 21/235 | (2011.01) |
| H04N 21/236 | (2011.01) |
| H04N 21/414 | (2011.01) |
| H04N 21/431 | (2011.01) |
| H04N 21/434 | (2011.01) |
| H04N 21/435 | (2011.01) |
| H04N 21/442 | (2011.01) |
| H04N 21/658 | (2011.01) |
| G09G 3/34 | (2006.01) |
| H04N 9/68 | (2006.01) |
| G09G 3/3208 | (2016.01) |
| H04N 21/84 | (2011.01) |

(52) U.S. Cl.
CPC ..... *H04N 21/235* (2013.01); *H04N 21/23418* (2013.01); *H04N 21/23614* (2013.01); *H04N 21/41407* (2013.01); *H04N 21/435* (2013.01); *H04N 21/4318* (2013.01); *H04N 21/4348* (2013.01); *H04N 21/4424* (2013.01); *H04N 21/6582* (2013.01); *G09G 2320/0626* (2013.01); *G09G 2330/021* (2013.01); *G09G 2360/16* (2013.01); *H04N 21/84* (2013.01)

(58) Field of Classification Search
USPC ...................................................... 348/468
See application file for complete search history.

(56) References Cited

U.S. PATENT DOCUMENTS

| | | | | |
|---|---|---|---|---|
| 2008/0272999 | A1* | 11/2008 | Kurokawa | G09G 3/3406 345/89 |
| 2008/0297463 | A1* | 12/2008 | Tsuru | G09G 3/3426 345/102 |
| 2008/0309811 | A1* | 12/2008 | Fujinawa | G02F 1/1347 348/333.01 |
| 2009/0298868 | A1* | 12/2009 | Orlow | A61K 31/47 514/305 |
| 2012/0075353 | A1* | 3/2012 | Dong | H04N 5/58 345/690 |
| 2012/0218313 | A1* | 8/2012 | Chiou | G09G 3/3406 345/690 |
| 2012/0281027 | A1 | 11/2012 | Kim | |
| 2012/0287168 | A1 | 11/2012 | Botzas et al. | |
| 2013/0093802 | A1* | 4/2013 | Tanaka | G09G 3/003 345/690 |
| 2013/0155119 | A1 | 6/2013 | Dai et al. | |
| 2013/0278642 | A1 | 10/2013 | Dong et al. | |
| 2013/0314448 | A1* | 11/2013 | Toksvig | G09G 3/3426 345/690 |
| 2014/0253601 | A1 | 9/2014 | Ma et al. | |
| 2014/0267464 | A1* | 9/2014 | Takamaru | G09G 3/3406 345/690 |
| 2015/0009249 | A1* | 1/2015 | Kudo | G09G 3/36 345/691 |

FOREIGN PATENT DOCUMENTS

| | | | |
|---|---|---|---|
| WO | WO 2004-075155 | A2 | 9/2004 |
| WO | WO 2008-092036 | A2 | 7/2008 |
| WO | 2013157895 | A1 | 10/2013 |
| WO | 2013157896 | A1 | 10/2013 |

OTHER PUBLICATIONS

Written Opinion of International Searching Authority dated Nov. 5, 2014 in connection with International Patent Application No. PCT/KR2014/006733, 6 pages.

"Information Technology—Green Video," ISO/IEC DIS 23008-1, ISO/IEC JTC/SC 29/WG11, XP30020869, Apr. 26, 2013, 47 pages.

Information Technology—MPEG Systems Technologies—Part 11: Energy-Efficient Media Consumption (Green Metadata), ISO/IEC DIS 23001-11, ISO/IEC JTC 1/SC 29/WG 11, XP30021081, Apr. 26, 2013, 54 pages.

Information Technology—MPEG Systems Technologies—Part 11: Energy-Efficient Media Consumption (Green Metadata), ISO/IEC SoDIS 23001-11, ISO/IEC JTC 1/SC 29/WG 11, XP30021335, Apr. 26, 2013, 54 pages.

Faramarzi, et al., "Display Adaption and Codec DVFS for Green MPEG," Samsung Electronics, International Organisation for Standardisation, ISO/IEC JTC1/SC29/WG11 MPEG2013/ m31588, XP30060040, Geneva, Switzerland, Oct. 2013, 8 pages.

Faramarzi, et al., "Signaling and Metadata for Display Adaption," Samsung Electronics, International Organisation for Standardisation, ISO/IEC JTC1/SC29/WG11 MPEG2014/ m32480, XP30060932, San Jose, USA, Jan. 2014, 8 pages.

Fernandes, et al., A No-Quality-Loss Operating Point and RGB Scaling for Display Adaption, Samsung Electronics, International Organisation for Standardisation, ISO/IEC JTC1/SC29/WG11 MPEG2014/ m33426, XP30061877, Valencia, Spain, Mar. 2014, 7 pages.

Information Technology—MPEG Systems Technologies—Part 11: Energy-Efficient Media Consumption (Green Metadata), ISO/IEC DIS 23001-11, ISO/IEC JTC 1/SC 29/WG 11, XP30062418, Apr. 26, 2013, 54 pages.

Information Technology—MPEG Systems Technologies—Part 11: Energy-Efficient Media Consumption (Green Metadata), ISO/IEC 23001-11, ISO/IEC 23001-11:2015, XP82007423, Jul. 15, 2015, 46 pages.

Foreign Communication From a Related Counterpart Application, European Application No. 14829068.7-1905, Extended European Search Report dated Feb. 20, 2017, 11 pages.

Cheng et al., "Power Minimization in a Backlit TFT-LCD Display by Concurrent Brightness and Contrast Scaling", Proceedings of the Design, Automation and Test in Europe Conference and Exhibition, vol. 1, Feb. 2004, pp. 252-257.

\* cited by examiner

DISPLAY POWER REDUCTION USING HISTOGRAM METADATA

CROSS-REFERENCE TO RELATED APPLICATIONS AND CLAIMS OF PRIORITY

This application claims priority under 35 U.S.C. § 119(e) to the following provisional applications:
U.S. Provisional Patent Application No. 61/858,031 filed Jul. 24, 2013;
U.S. Provisional Patent Application No. 61/893,650 filed Oct. 21, 2013;
U.S. Provisional Patent Application No. 61/895,242 filed Oct. 24, 2013;
U.S. Provisional Patent Application No. 61/909,262 filed Nov. 26, 2013;
U.S. Provisional Patent Application No. 61/925,558 filed Jan. 9, 2014; and
U.S. Provisional Patent Application No. 61/971,892 filed Mar. 28, 2014.
All of these provisional applications are hereby incorporated by reference into this patent document in their entirety.

TECHNICAL FIELD

This disclosure relates generally to the reduction of energy consumption in wireless mobile communication devices and, more specifically, to content-based display adaptation control for video content displayed on a wireless mobile communication device.

BACKGROUND

In recent years, the display resolution on mobile devices has advanced significantly to where 720 p or even higher super liquid crystal display (LCD) displays or organic light emitting diode (OLED) displays are mainstream for smart phones and tablets. However, such high display resolutions typically require much more energy for rendering, especially for video where high frequency frame buffering and display panel refreshing are indispensable.

For LCD displays, power consumption is often a monotonic function of the backlighting brightness level. For OLED displays, power consumption is often controlled by the supply voltage as well as the display content itself. While brightness control is already implemented on some mobile devices, those controls typically must be adjusted prior to issuing a new job, meaning before starting playback of a video. For example, brightness may be set at 100%, 50%, or even 25% prior to watching a video, but the brightness cannot be changed dynamically without interrupting playback of the video. In addition, since power consumption is determined by the supply voltage and input image for OLED displays, current implementations do not provide a mechanism for adapting the supply voltage.

In one prior approach, backlight scaling based on image RGB components has been performed. However, such methods have been designed for still images and result in flicker when applied to videos. Note that an RGB component is a single sample representing one of the three primary colours of the RGB colour space which is a colour space based on the red, green and blue primaries. In some embodiments, pixel intensities may be used instead of RGB components.

SUMMARY

This disclosure provides methods and apparatuses for implementing dynamic, content-based display adaptation and corresponding power reduction in a display screen.

In a first example, a method includes identifying an optimal backlight value for at least one quality level of a first video segment. The method also includes transmitting data for the first video segment, where the transmitted data for the first video segment includes a first message containing a first set of display adaptation information. The first set of display adaptation information includes the optimal backlight value for the at least one quality level of the first video segment. The method further includes identifying a backlight value for the at least one quality level of a second video segment. The method also includes determining a maximum backlight value change threshold between successive video segments. In addition, the method includes applying temporal smoothing between the optimal backlight value for the at least one quality level of the first video segment and the backlight value for the at least one quality level of the second video segment based on the maximum backlight value change threshold.

In a second example, a user equipment (UE) for a communication system is provided. The UE includes a receiver configured to receive data of a first video segment, the data of the first video segment comprising a first message containing a first set of display adaptation information. The first set of display adaptation information includes an optimal backlight value for at least one quality value for the first video segment. The optimal backlight value for the at least one quality value of the first video segment is determined based on a maximum backlight value change threshold between the first video segment and a second video segment. The UE also includes a display configured to display the first video segment with the optimal backlight value for the at least one quality value of the first video segment. The receiver is further configured to receive data of the second video segment, the data of the second video segment comprising a second message containing a second set of display adaptation information. The second set of display adaptation information comprises an optimal backlight value for at least one quality value of the second video segment. The optimal backlight value for the at least one quality value of the second video segment is determined based on a maximum backlight value change threshold between the second video segment and a third video segment and an applied temporal smoothing between the optimal backlight value for the at least one quality level of the first video segment and the optimal backlight value for the at least one quality level of the second video segment.

In a third example, a method includes identifying a dynamic RGB-component range for a lowest quality level of a first video segment and identifying a lower bound and an upper bound within the dynamic RGB-component range for the lowest quality level of the first video segment. The method also includes transmitting data for the first video segment, where the transmitted data for the first video segment includes a first message containing a first set of display adaptation information. The first set of display adaptation information includes the lower bound and the upper bound within the dynamic RGB-component range for the lowest quality level of the first video segment. The method further includes identifying a dynamic RGB-component range for the lowest quality level of a second video segment and identifying a lower bound and an upper bound within the dynamic RGB component range for the lowest quality level of the second video segment. The method also includes determining a maximum bound change threshold between successive video segments. In addition, the method includes applying temporal smoothing on at least one of the lower bound of the second video segment and the upper bound of the second video segment based on the maximum bound change threshold.

In a fourth example, a system includes a transmitter configured to transmit data for a first video segment, where the data for the first video segment includes a first message containing a first set of display adaptation information. The first set of display adaptation information includes a lower bound and an upper bound within a dynamic RGB component range for a lowest quality level of the first video segment. The system also includes at least one processing device configured to identify the dynamic RGB component range for the lowest quality level of the first video segment and to identify the lower bound and the upper bound within the dynamic RGB component range for the lowest quality level of the first video segment. The at least one processing device is also configured to identify a dynamic RGB component range for the lowest quality level of a second video segment and to identify a lower bound and an upper bound within the dynamic RGB component range for the lowest quality level of the second video segment. The at least one processing device is further configured to determine a maximum bound change threshold between successive video segments. In addition, the at least one processing device is configured to apply temporal smoothing on at least one of the lower bound of the second video segment and the upper bound of the second video segment based on the maximum bound change threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication unless explicitly specified. The terms "include" and "comprise," as well as derivatives thereof, mean inclusion without limitation. The term "or" is inclusive, meaning "and/or." The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical signals or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior uses as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1A through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wired or wireless communication system, such as with a battery-powered smartphone, laptop, or other device having a wired or wireless network connection.

In this disclosure, metadata used for display adaptation is embedded within a video stream or other video content information using a Supplemental Enhancement Information (SEI) message, which is parsed at a decoder to help with display power reduction. In other embodiments, the metadata can be delivered out-of-band using a transport mechanism, storage medium, or the like. For LCD displays, the display backlight can be adjusted. For OLED displays, the display supply voltage can be adapted. Elements in an extended SEI message can be derived at the encoder during video encoding. The metadata used for display adaptation can be used to accommodate video playback without flicker and provide power savings. Furthermore, the metadata used for display adaptation can be used to provide a tradeoff between display quality and power reduction.

Display adaptation is defined by enabling an SEI message (i.e., display_adaptation( )) that can be inserted into a video stream frame by frame, group of pictures (GOP) by GOP, scene by scene, or even time interval by time interval, depending on the underlying applications and hardware capabilities. By comparison with a frame-level solution, GOP-, scene- or time interval-based approaches require less overhead for message insertion. For processors that do not support high-frequency display adaptation (such as every 33 milliseconds (ms) for a 30 Hertz (Hz) video), GOP-, scene- or time interval-based schemes are better than a frame-based solution. Nonetheless, the concept is explained herein primarily using a frame-level solution.

Figure 1A:
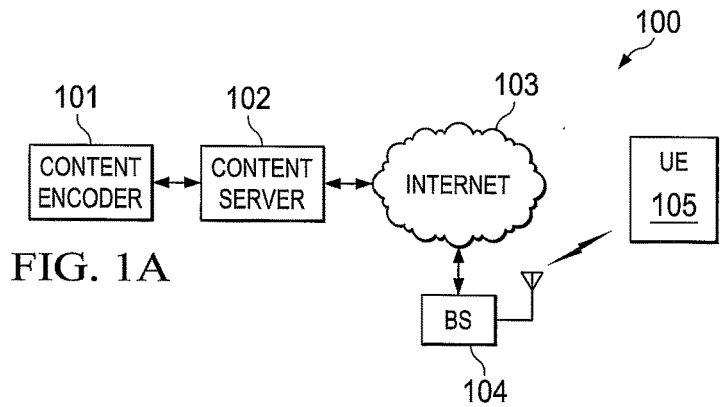
FIG. 1A is a high level diagram illustrating an example network within which devices may implement dynamic, content-based display adaptation according to this disclosure.

FIG. 1A is a high-level diagram illustrating an example network 100 within which devices may implement dynamic, content-based display adaptation according to this disclosure. As shown in FIG. 1, the network 100 includes a content encoder 101, which can include a data processing system having an encoder controller configured to encode video content. The video content could be encoded in accordance with existing procedures but with display adaptation information embedded within Network Abstraction Layer Unit (NALU) header(s) as described in further detail below. The content encoder 101 can be communicably coupled to (or alternatively integrated with) a content server 102, which can include a data processing system configured to deliver video content to user devices. The content server 102 can be coupled by a communications network, such as the Internet 103 and a wireless communication system including a base station (BS) 104, for delivery of the video content to a user device 105. The user device 105 can also be referred to as a user equipment (UE) or a mobile station (MS). As noted above, the user device 105 can be a "smart" phone, tablet, or other device capable of functions other than wireless voice communications, including at least playing video content. Alternatively, the user device 105 can be a laptop computer or other wired or wireless device having an LCD or OLED display and benefitting from dynamic, content-based display power reduction during playback of videos, such as any device that is primarily battery-powered during at least periods of typical operation.

Figure 1B:
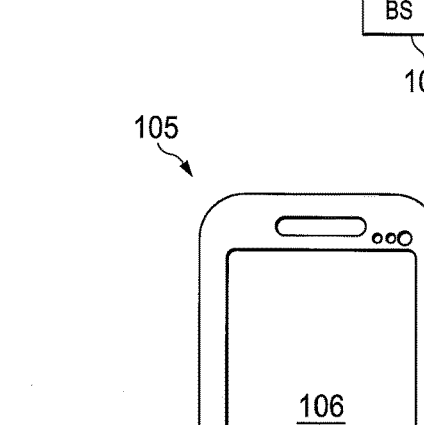
FIG. 1B is a front view of an example user device from the network of FIG. 1A within which dynamic, content-based display adaptation can be implemented according to this disclosure.
Figure 1C:
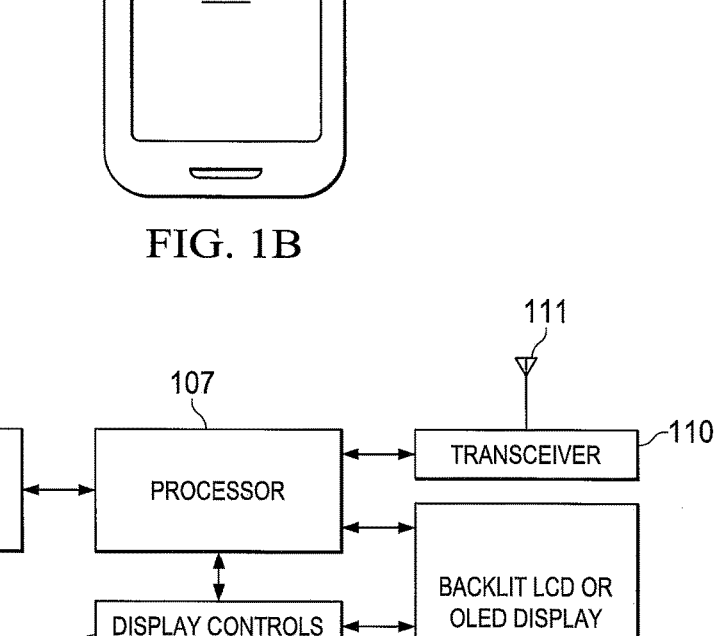
FIG. 1C is a high level block diagram of the functional components in the example user device of FIG. 1A according to this disclosure.

FIG. 1B is a front view of an example user device 105 from the network 100 of FIG. 1A within which dynamic, content-based display adaptation can be implemented according to this disclosure. FIG. 1C is a high level block diagram of the functional components in the example user device 105 of FIG. 1A according to this disclosure. The user device 105 in this example represents a mobile phone or smartphone and includes a display 106. The display 106 could include a backlit LCD (which includes an optional luminance source 113 depicted in FIG. 1C) or OLED display. A processor 107 coupled to the display 106 can control content that is presented on the display 106. The processor 107 and other components within the user device 105 can be powered by a battery or other power source that can be recharged by an external power source or can be powered by an external power source. A memory 108 coupled to the processor 107 can store or buffer video content for playback by the processor 107 and presentation on the display 106 and can also store a video player application (or "app") 109 for performing such video playback. The video content being played can be received, either contemporaneously (such as overlapping in time) with the playback of the video content or prior to the playback, via a transceiver 110 connected to an antenna 111. As described above, the video content can be received in wireless communications from a base station 104. In this example embodiment, the video content received by the user device 105 for playback and presentation on the display 106 can include display adaptation information embedded within SEI message(s). The display adaptation information can be employed by the processor 107 to set display controls 112 for the optional luminance source 113 and the display 106.

Figure 2A:
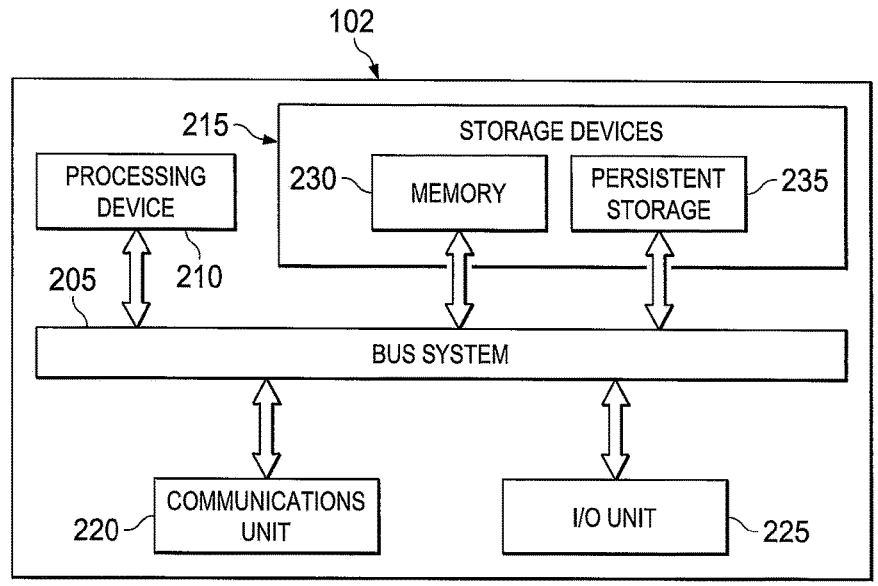
FIG. 2A is a high level block diagram of an example content server from the network of FIG. 1A within which dynamic, content-based display adaptation can be implemented according to this disclosure.

FIG. 2A is a high level block diagram of an example content server 102 from the network 100 of FIG. 1A within which dynamic, content-based display adaptation can be implemented according to this disclosure. As shown in FIG. 2A, the server 200 includes a bus system 205, which can be configured to support communication between at least one processing device 210, at least one storage device 215, at least one communications unit 220, and at least one input/output (I/O) unit 225.

The processing device 210 is configured to execute instructions that can be loaded into a memory 230. The server 200 can include any suitable number(s) and type(s) of processing devices 210 in any suitable arrangement. Example processing devices 210 can include microprocessors, microcontrollers, digital signal processors, field programmable gate arrays, application specific integrated circuits, and discrete circuitry. The processing device(s) 210 can be configured to execute processes and programs resident in the memory 230, such as operations for generating display adaptation metadata.

The memory 230 and a persistent storage 235 are examples of storage devices 215, which represent any structure(s) capable of storing and facilitating retrieval of information (such as data, program code, or other suitable video information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications unit 220 is configured to support communications with other systems or devices. For example, the communications unit 220 can include a network interface card or a wireless transceiver facilitating communications over the network 103. The communications unit 220 can be configured to support communications through any suitable physical or wireless communication link(s).

The I/O unit 225 is configured to allow for input and output of data. For example, the I/O unit 225 can be configured to provide a connection for user input through a keyboard, mouse, keypad, touchscreen, or other suitable input device. The I/O unit 225 can also be configured to send output to a display, printer, or other suitable output device. In some embodiments, the I/O unit 225 can be configured to allow the input or output of display adaptation information embedded within SEI message(s).

Note that while FIG. 2A is described as representing the server 102 of FIG. 1A, the same or similar structure can be used in one or more different user devices. For example, a laptop or desktop computer can have the same or similar structure as that shown in FIG. 2A.

Figure 2B:
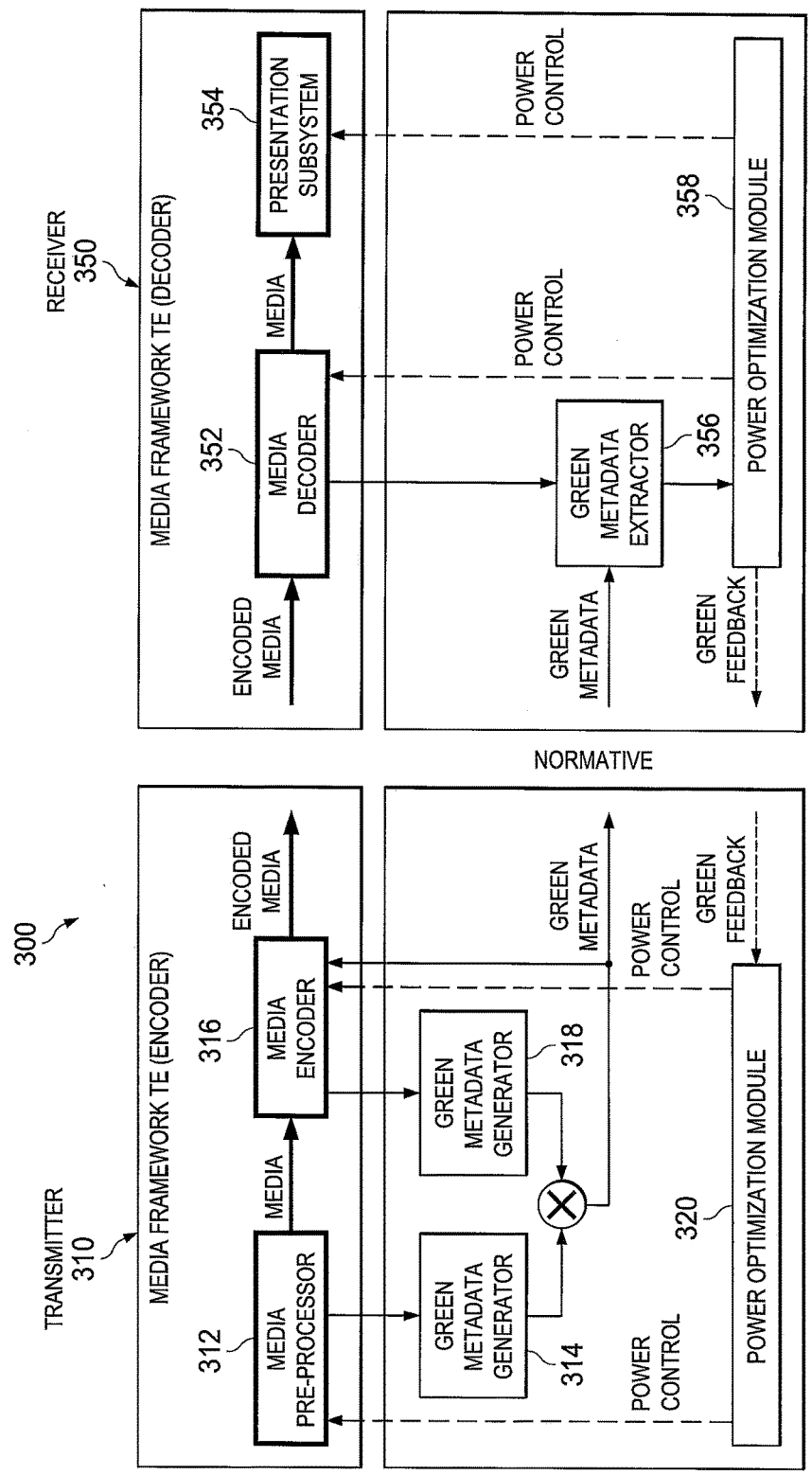
FIG. 2B is an example functional architecture to implement display adaptation (DA) according to this disclosure.

FIG. 2B is an example functional architecture to implement display adaptation (DA) according to this disclosure. Generally, DA provides Green Metadata having pixel-intensity (or RGB-component) statistics and quality indicators. As illustrated in FIG. 2B, the functional architecture 300 can includes a transmitter 310 and a receiver 350. The transmitter 310 can include a media pre-processor 312, a first green metadata generator 314, a video encoder 316, a second green metadata generator 318, and a power optimizer module 320. The receiver 350 can include a media decoder 352, a presentation subsystem 354, a green metadata extractor 356, and a power optimizer module 358.

As disclosed herein, media information can be embedded using an extended NALU header. Such a header message can be parsed at a decoder (such as the user device 105) to reduce display power consumption via the display brightness for an LCD display and via the supply voltage for an OLED display. Elements in this extended NALU header can be derived at an encoder during video encoding.

Figure 3:
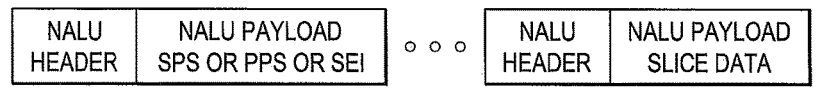
FIG. 3 illustrates an example of Network Abstraction Layer Unit (NALU) definitions according to this disclosure.

FIG. 3 illustrates an example of NALU definitions according to this disclosure. Typically, an NALU includes an NALU header and an NALU payload. An NALU header can be parsed at the decoder for appropriate decoding operations. For example, if the NALU header indicates that the current NALU is a SPS (sequence parameter set), SPS parsing and initialization can be activated. If the NALU header indicates that the current NALU is a slice NALU, slice decoding can be launched.

In H.264/AVC and its extensions, NALU can be byte-aligned. Depending on whether the NALU is a regular single layer packet or scalable packet, the NALU header can be one byte or four bytes. Table 1 below shows the NALU syntax and the NALU parsing process for H.264/AVC and its extensions.

TABLE 1

| nal_unit( NumBytesInNALunit ) { | C | Descriptor |
|---|---|---|
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type == 14 \|\| nal_unit_type == 20 ) { | | |
|     svc_extension_flag | All | u(1) |
|     if( svc_extension_flag ) | | |
|       nal_unit_header_svc_extension( ) /* specified in Annex G */ | All | |
|     else | | |
|       nal_unit_header_mve_extension( ) /* specified in Annex H */ | All | |
|     nalUnitHeaderBytes += 3 | | |
|   } | | |
|   for( i = nalUnitHeaderBytes; i < NumBytesInNALunit: i++ ) { | | |
|     if( i + 2 < NumBytesInNALunit && next_bits( 24 ) == 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

Figure 4:
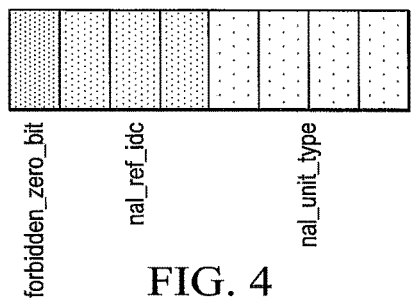
FIG. 4 illustrates an example of a normal one-byte NALU header according to this disclosure.

FIG. 4 illustrates an example of a normal one-byte NALU header according to this disclosure. The NALU header can include a one-bit forbidden_zero_bit field (always zero), a three-bit nal_ref_idc field indicating whether this NALU can be referred, and a five-bit nal_unit_type field showing the exact type of the NALU payload according to this disclosure. If the nal_unit_type field is equal to 14 or 20, an extra three bytes can be parsed to derive the necessary information for H.264 scalable video.

As shown in Table 2 below, H.264/AVC defines various nal_unit_type values for appropriate parsing and decoding, where values from 24 to 31 can be unspecified. Hence, a new nal_unit_type value for display_adaptation( ), such as a value equal to 25, indicating the display adaptation associated information can be used to parse and initialize the display adaptation associated data and structure. Each time an NALU header is received by a decoder, the decoder can parse the received NALU header and enable the frame-level, GOP-level, scene-level or time interval-level adaptation.

TABLE 2

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-NCL |
| 13 | Sequence parameter set extension seq_parameter_set_extension_rbsp( ) | 10 | non-VCL | non-VCL |
| 14 | Prefix NAL unit prefix_nal_unit_rbsp( ) | 2 | non-VCL | suffix dependent |
| 15 | Subset sequence parameter set subset_seq_parameter_set_rbsp( ) | 0 | non-VCL | non-VCL |
| 16 ... 18 | Reserved | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21 ... 23 | Reserved | | non-VCL | non-VCL |
| 24 ... 31 | Unspecified | | non-VCL | non-VCL |

Tables 3 and 4 shown below illustrate modifications to extend current definitions of NALU headers to support such display adaptation information embedding for ISO/IEC 14996-10. A similar format can be used for ISO/IEC 23008.

TABLE 3

| nal_unit( NumBytesInNALunit ) { | C | Descript |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| if( nal_unit_type == 14 \|\| nal_unit_type == 20 ) { | | |
|   svc_extension_flag | All | u(1) |
|   if( svc_extension_flag ) | | |
|     nal_unit_header_svc_extension( )  /* specified in Annex G */ | All | |
|   Else | | |
|     nal_unit_header_mvc_extension( )  /* specified in Annex H */ | All | |
|   nalUnitHeaderBytes += 3 | | |
| } | | |
| if (nal_unit_type == 25 ){ | | |
|   display_scaling_method | All | f(4) |
| if (display_scaling_method == BRIGHTNESS_PRESERVED){ | | |
|   Xmax | All | f(8) |
|   saturation parameter | All | f(8) |
| }else if (display_scaling_method == CONTRAST_BRIGHTNESS_PRESERVED){ | | |
|   max_intensity | All | f(8) |
|   min_intensity | All | f(8) |
|   mapped_max_intensity | All | f(8) |
| }else if(display_scaling_method == PERCEPTUAL_LOSSLESS){ | | |
|   pixel_hist_stepsize | All | f(8) |
|   max_pixel_value | All | f(8) |
|   min_pixel_value | All | f(8) |
| }else if(display_scaling_method == HISTOGRAM_BASED){ | | |
|   NumTails | All | f(4) |
|   for(i = 0; i < NumTails; i++) | | |
|     max_Intensity[i] | All | f(8) |
|     TailDistributionPercentage[i] | All | f(7) |
| } | | |
| }else if(display_scaling_method == QUALITY_BASED){ | | |
|   num_quality_levels | All | f(4) |
|   for(i = 0; i < num_quality_levels; i++) | | |
|     max_intensity[i] | All | f(8) |
|     peak_signal_to_noise_ratio[i] | All | f(7) |
| } | | |
| }else if(display_scaling_method == QUALITY_CONTRAST_BRIGHTNESS_BASED){ | | |
|   NumQualityLevels | All | f(4) |
|   for(i = 0; i < NumQualityLevels; i++) | | |

TABLE 3-continued

| nal_unit( NumBytesInNALunit ) { | | C | Descript |
|---|---|---|---|
| | max_intensity[i] | All | f(8) |
| | min_intensity[i] | All | f(8) |
| | mapped_max_intensity[i] | All | f(8) |
| | PeakSignalToNoiseRatio[i] | All | f(7) |
| } | | | |
| for( i = nalUnitHeaderBytes; i < NumBytesInNALunit; i++ ) { | | | |
|   if( i + 2 < NumBytesInNALunit && next_bits( 24 ) == 0x000003 ) { | | | |
| | rbsp_byte[ NumBytesInRBSP++ ] | All | b(8) |
| | rbsp_byte[ NumBytesInRBSP++ ] | All | b(8) |
| | i += 2 | | |
| | emulation_prevention_three_byte /* equal to 0x03 */ | All | f(8) |
|   } else | | | |
| | rbsp_byte[ NumBytesInRBSP++ ] | All | b(8) |
| } | | | |
| } | | | |

TABLE 4

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-VCL |
| 13 | Sequence parameter set extension seq_parameter_set_extension_rbsp( ) | 10 | non-VCL | non-VCL |
| 14 | Prefix NAL unit prefix_nal_unit_rbsp( ) | 2 | non-VCL | suffix dependent |
| 15 | Subset sequence parameter set subset_seq_parameter_set_rbsp( ) | 0 | non-VCL | non-VCL |
| 16 . . . 18 | Reserved | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21 . . . 23 | Reserved | | non-VCL | non-VCL |
| 24 | Complexity Estimation complexity_estimator( ) | | non-VCL | non-VCL |
| 25 | Display adaptation display_adaptation( ) | | non-VCL | non-VCL |
| 26 . . . 31 | Unspecified | | non-VCL | non-VCL |

In other embodiments, SEI messages can be used instead of extended NALUs. Table 5 illustrates an SEI message defined for display adaptation with a payload of 55. Table 6 illustrates a format of the display-adaptation SEI message for ISO/IEC 14996-10. The same or similar formats can be used for ISO/IEC 23008.

TABLE 5

| sei_payload( payloadType, payloadSize ) { | C | Descriptor |
|---|---|---|
|   if( payloadType == 0 ) | | |
|     buffering_period( payloadSize ) | 5 | |
|   else if( payloadType == 1 ) | | |
|     pic_timing( payloadSize ) | 5 | |
|   else if( payloadType == 2 ) | | |
|     pan_scan_rect( payloadSize ) | 5 | |
|   else if( payloadType == 3 ) | | |

TABLE 5-continued

| sei_payload( payloadType, payloadSize ) { | C | Descriptor |
|---|---|---|
|     filler_payload( payloadSize ) | 5 | |
|   else if( payloadType = = 4 ) | | |
|     user_data_registered_itu_t_t35( payloadSize ) | 5 | |
|   else if( payloadType = = 5 ) | | |
|     user_data_unregistered( payloadSize ) | 5 | |
|   else if( payloadType = = 6 ) | | |
|     recovery_point( payloadSize ) | 5 | |
|   else if( payloadType = = 7 ) | | |
|     dec_ref_pic_marking_repetition( payloadSize ) | 5 | |
|   else if( payloadType = = 8 ) | | |
|     spare_pic( payloadSize ) | 5 | |
|   else if( payloadType = = 9 ) | | |
|     scene_info( payloadSize ) | 5 | |
|   else if( payloadType = = 10 ) | | |
|     sub_seq_info( payloadSize ) | 5 | |
|   else if( payloadType = = 11 ) | | |
|     sub_seq_layer_characteristics( payloadSize ) | 5 | |
|   else if( payloadType = = 12 ) | | |
|     sub_seq_characteristics( payloadSize ) | 5 | |
|     else if( payloadType = = 13 ) | | |
|     full_frame_freeze( payloadSize ) | 5 | |
|   else if( payloadType = = 14 ) | | |
|     full_frame_freeze_release( payloadSize ) | 5 | |
|   else if( payloadType = = 15 ) | | |
|     full_frame_snapshot( payloadSize ) | 5 | |
|   else if( payloadType = = 16 ) | | |
|     progressive_refinement_segment_start( payloadSize ) | 5 | |
|   else if( payloadType = = 17 ) | | |
|     progressive_refinement_segment_end( payloadSize ) | 5 | |
|   else if( payloadType = = 18 ) | | |
|     motion_constrained_slice_group_set( payloadSize ) | 5 | |
|   else if( payloadType = = 19 ) | | |
|     film_grain_characteristics( payloadSize ) | 5 | |
|   else if( payloadType = = 20 ) | | |
|     deblocking_filter_display_preference( payloadSize ) | 5 | |
|   else if( payloadType = = 21 ) | | |
|     stereo_video_info( payloadSize ) | 5 | |
|   else if( payloadType = = 22 ) | | |
|     post_filter_hint( payloadSize ) | 5 | |
|   else if( payloadType = = 23 ) | | |
|     tone_mapping_info( payloadSize ) | 5 | |
|   else if( payloadType = = 24 ) | | |
|     scalability_info( payloadSize )  /* specified in Annex G */ | 5 | |
|   else if( payloadType = = 25 ) | | |
|     sub_pic_scalable_layer( payloadSize )  /* specified in Annex G */ | 5 | |
|   else if( payloadType = = 26 ) | | |
|     non_required_layer_rep( payloadSize )  /* specified in Annex G */ | 5 | |
|   else if( payloadType = = 27 ) | | |
|     priority_layer_info( payloadSize )  /* specified in Annex G */ | 5 | |
|   else if( payloadType = = 28 ) | | |
|     layers_not_present( payloadSize )  /* specified in Annex G */ | 5 | |
|   else if( payloadType = = 29 ) | | |
|     layer_dependency_change( payloadSize )  /* specified in Annex G */ | 5 | |
|   else if( payloadType = = 30 ) | | |
|     scalable_nesting( payloadSize )  /* specified in Annex G */ | 5 | |
|   else if( payloadType = = 31 ) | | |
|     base_layer_temporal_hrd( payloadSize )  /* specified in Annex G */ | 5 | |
|   else if( payloadType = = 32 ) | | |
|     quality_layer_integrity_check( payloadSize )  /* specified in Annex G */ | 5 | |
|   else if( payloadType = = 33 ) | | |
|     redundant_pic_property( payloadSize )  /* specified in Annex G */ | 5 | |
|   else if( payloadType = = 34 ) | | |
|     t10_dep_rep_index( payloadSize )  /* specified in Annex G */ | 5 | |
|   else if( payloadType = = 35 ) | | |
|     t1_switching_point( payloadSize )  /* specified in Annex G */ | 5 | |
|   else if( payloadType = = 36 ) | | |
|     parallel_decoding_info( payloadSize )  /* specified in Annex H */ | 5 | |
|   else if( payloadType = = 37 ) | | |
|     mvc_scalable_nesting( payloadSize )  /* specified in Annex H */ | 5 | |
|   else if( payloadType = = 38 ) | | |
|     view_scalability_info( payloadSize )  /* specified in Annex H */ | 5 | |
|   else if( payloadType = = 39 ) | | |
|     multiview_scene_info( payloadSize )  /* specified in Annex H */ | 5 | |
|   else if( payloadType = = 40 ) | | |
|     multiview_acquisition_info( payloadSize )  /* specified in Annex H */ | 5 | |
|   else if( payloadType = = 41 ) | | |
|     non_required_view_component( payloadSize )  /* specified in Annex H */ | 5 | |
|   else if( payloadType = = 42 ) | | |
|     view_dependency_change( payloadSize )  /* specified in Annex H */ | 5 | |
|   else if( payloadType = = 43 ) | | |
|     operation_points_not_present( payloadSize )  /* specified in Annex H */ | 5 | |
|   else if( payloadType = = 44 ) | | |
|     base_view_temporal_hrd( payloadSize )  /* specified in Annex H */ | 5 | |
|   else if( payloadType = = 45 ) | | |
|     frame_packing_arrangement( payloadSize ) | 5 | |
|   else if( payloadType = = 46 ) | | |
|     multiview_view_position( payloadSize )  /* specified in Annex H */ | 5 | |
|   else if( payloadType = = 47 ) | | |
|     display_orientation( payloadSize )  /* specified in Annex I */ | 5 | |
|   else if( payloadType = = 48 ) | | |
|     mvcd_view_scalable_nesting( payloadSize )  /* specified in Annex I */ | 5 | |
|   else if( payloadType = = 49 ) | | |
|     mvcd_view_scalability_info_( payloadSize )  /* specified in Annex I */ | 5 | |
|   else if( payloadType = = 50 ) | | |
|     depth_representation_info( payloadSize ) | 5 | |
|   else if( payloadType = = 51 ) | | |
|     three_dimensional_reference_displays_info( payloadSize ) | 5 | |
|   else if( payloadType = = 52 ) | | |
|     depth_timing( payloadSize )  /* specified in Annex I */ | 5 | |
|   else if( payloadType = = 53 ) | | |
|     depth_sampling_info( payloadSize ) | 5 | |
|     else if( payloadType = = 54 ) | | |
|     complexity_estimator( payloadSize) /* specified for complexity estimation*/ | 5 | |
|     else if( payloadType = = 55 ) | | |
|       display_adaptation ( payloadSize) /* specified for display adaptation*/ | 5 | |
|   else | | |
|     reserved_sei_message( payloadSize ) | 5 | |
|   if( !byte_aligned( ) ) { | | |
|     bit_equal_to_one  /* equal to 1 */ | 5 | f(1) |
|     while( !byte_aligned( ) ) | | |
|       bit_equal_to_zero  /* equal to 0 */ | 5 | f(1) |
|   } | | |
| } | | |

TABLE 6

| display_adaptation( payloadSize ) { | C | Descriptor |
|---|---|---|
|    display_scaling_method | 5 | f(4) |
|    if (display_scaling_method == BRIGHTNESS_PRESERVED){ | | |
|       Xmax | 5 | f(8) |
|       saturation parameter | 5 | f(8) |
|    }else if (display_scaling_method == CONTRAST_BRIGHTNESS_PRESERVED){ | | |
|       max_intensity | 5 | f(8) |
|       min_intensity | 5 | f(8) |
|       mapped_max_intensity | 5 | f(8) |
|    }else if(display_scaling_method == PERCEPTUAL_LOSSLESS){ | | |
|       pixel_hist_stepsize | 5 | f(8) |
|       max_pixel_value | 5 | f(8) |
|       min_pixel_value | 5 | f(8) |
|    }else if(display_scaling_method == HISTOGRAM_BASED){ | | |
|       NumTails | 5 | f(4) |
|       for(i = 0; i < NumTails; i++) | | |
|          max_Intensity[i] | 5 | f(8) |
|          TailDistributionPercentage[i] | 5 | f(7) |
|    } | | |
|    }else if(display_scaling_method == QUALITY_BASED){ | | |
|       num_quality_levels | 5 | f(4) |
|       for(i = 0; i < num_quality_levels; i++) | | |
|          max_intensity[i] | 5 | f(8) |
|          peak_signal_to_noise_ratio[i] | 5 | f(7) |
|    } | | |
|    }else if(display_scaling_method == QUALITY_CONTRAST_BRIGHTNESS_BASED) { | 5 | |
|       NumQualityLevels | 5 | f(4) |
|       for(i = 0; i < NumQualityLevels; i++) | | |
|          max_intensity[i] | 5 | f(8) |
|          min_intensity[i] | 5 | f(8) |
|          mapped_max_intensity[i] | 5 | f(8) |
|          PeakSignalToNoiseRatio[i] | 5 | f(7) |
| } | | |

The display adaptation (DA) metadata in an SEI message (or extended NALU) can be applicable to a system until a next SEI message (or extended NALU) arrives containing DA metadata. In some embodiments, display adaptation can be used to preserve brightness of a video display. Before decoding every frame, an SEI message (or extended NALU) can be parsed to have the maximum pixel value, Xmax, and saturation parameter, S. These parameters can be used to scale up the current reconstructed frame.

Figure 5:
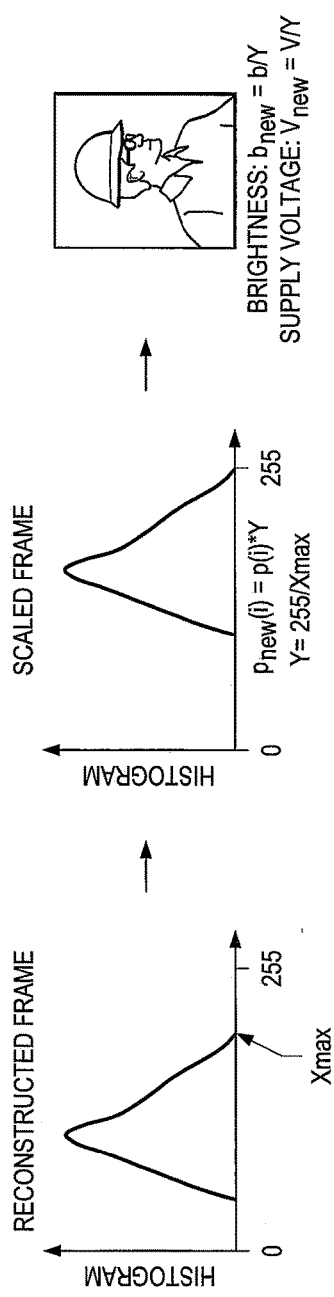
FIGS. 5 and 6 illustrate examples of RGB-component histograms according to this disclosure.
Figure 6:
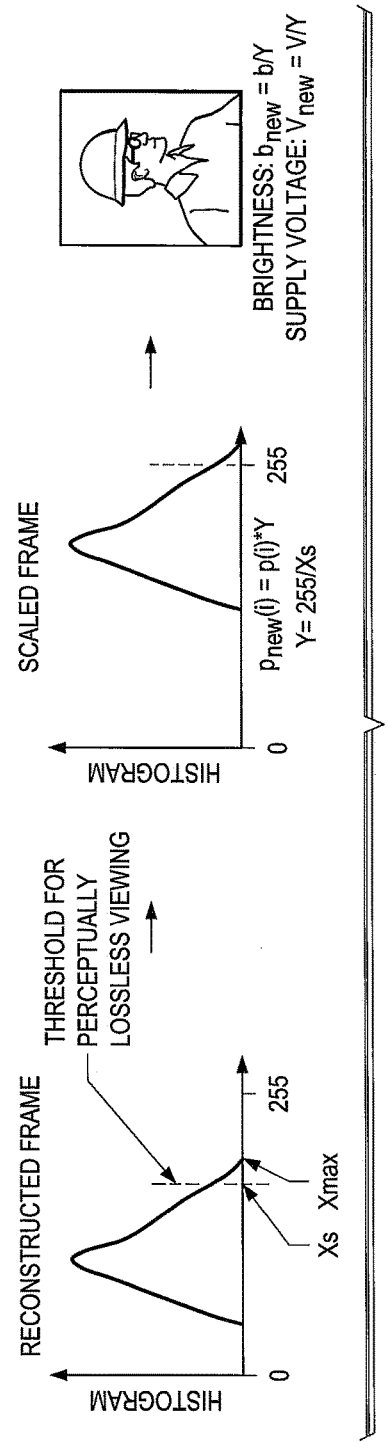

FIGS. 5 and 6 illustrate examples of RGB-component histograms according to this disclosure. Let p[i] denote the $i^{th}$ RGB-component in a frame, and let b denote the default backlight setting (or supply voltage) of the display. The perceived brightness of the $i^{th}$ RGB-component is expressed as p[i]*b. As illustrated in FIG. 5, when S=0, the DA can alter the RGB-component histogram after scaling each RGB component in the frame from p[i] to p[i]*$\gamma$. Furthermore, because the saturation parameter is set to 0, XS=Xmax and $\gamma$=255/Xmax. Therefore, pixels at the maximum RGB-component Xmax can be scaled by $\gamma$ to 255 so that no RGB-component saturation can occur. Accordingly, the perceived brightness of RGB-component p[i] after pixel scaling and backlight scaling is p[i]*$\gamma$*b/$\gamma$=p[i]*b, and thus image perception can be unaltered by DA. However, even though the image perception is unaltered by DA, the metadata can reduce power consumption because the power consumption is proportional to the backlight setting, which is scaled down from b to b/$\gamma$.

As illustrated in FIG. 6, when S>0, the DA can also alter the RGB-component histogram after scaling each RGB component in the frame from p[i] to p[i]*$\gamma$. Furthermore, because the saturation parameter is a non-zero parameter, XS=(1−S/256)Xmax and $\gamma$=255/XS. Accordingly, RGB-components with value=XS can be scaled by $\gamma$ to 255, and all RGB components with values larger than XS can saturate at 255 after scaling by $\gamma$.

For maximum power reduction without perceived quality degradation, the saturation parameter, and consequently XS, can be chosen so that a minimal number of RGB components will saturate after scaling. Hence, as shown in FIG. 6, Xs can determine a threshold for perceptually lossless viewing after pixel and backlight scaling. In some embodiments, Xs can be selected so that only 2% of the RGB components in the frame are beyond the threshold and can therefore saturate after scaling. Even with this small amount of RGB-component saturation, a specific implementation of DA can provide 26.26% power reduction.

In some embodiments, the Xmax and saturation parameter metadata can be determined from the Y (intensity) component of a YUV-colorspace representation of the video frame. For example, when a user device display is displaying a picture or video, the pixel scaling by $\gamma$ with saturation at 255 can be done individually for the R, G and B channels in an RGB-colorspace representation of the video frame. In particular embodiments, pixel scaling can be done on the Y-component with saturation at 255. Subsequently, the YUV-colorspace representation can be converted into an RGB-colorspace representation for display.

Figures 7A, 7B, 7C, 7D:
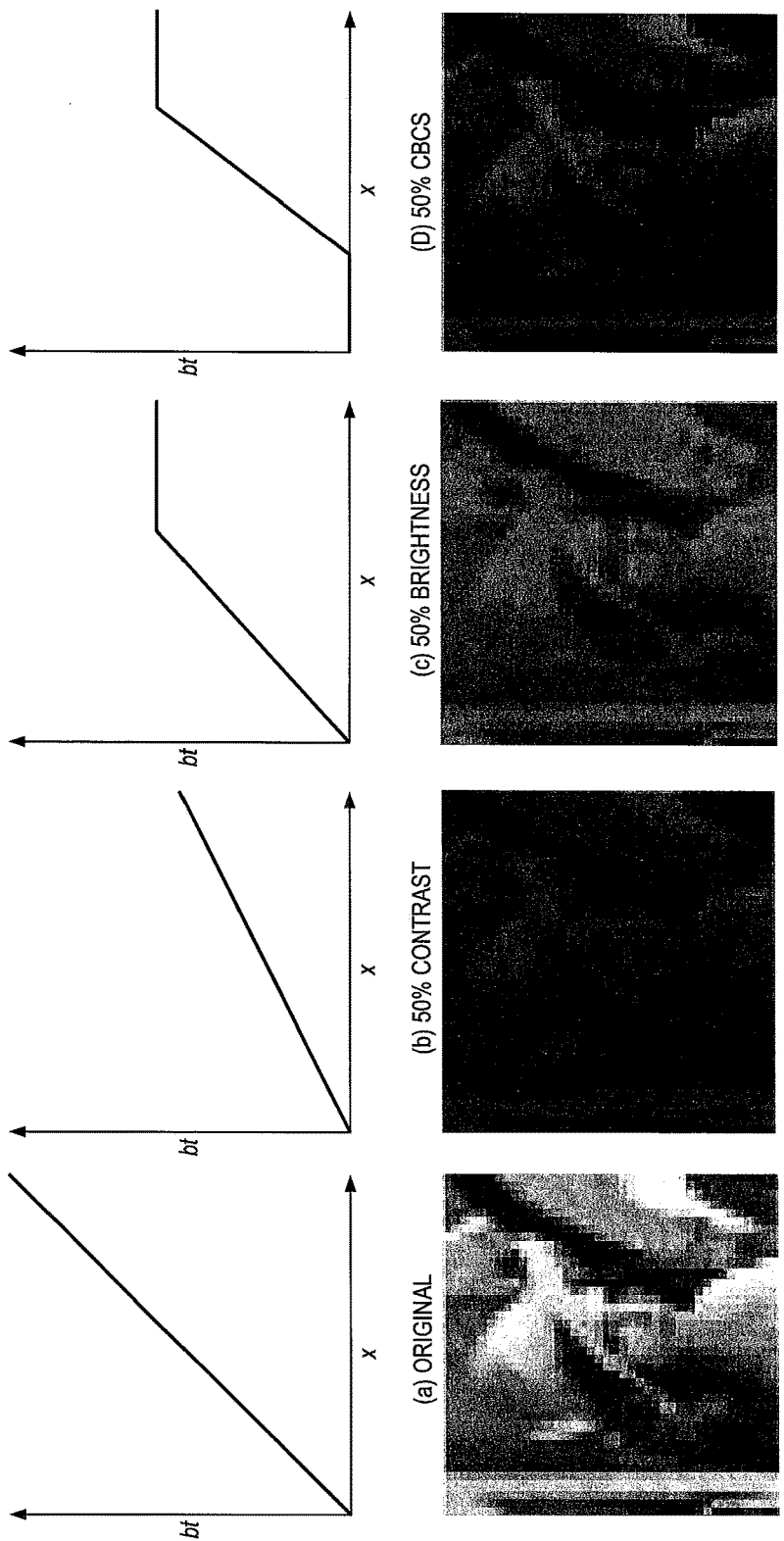
FIGS. 7A through 7D illustrate examples of relationships between RGB components and perceived RGB components according to this disclosure.

FIGS. 7A through 7D illustrate examples of relationships between RGB components and perceived pixels according to this disclosure. In some embodiments, a contrast_brightness_preserved method can be used with the implementation of display adaptation. It should be understood that RGB components can be denoted by x, the backlight scaling factor can be denoted by b, and the mapped RGB components can be denoted by t(x) or t. Without any RGB-component mapping or backlight scaling, FIG. 7A shows a relationship between the RGB components x and the perceived pixels, which can be referred to as an identity mapping. For the brightness_preserved method, when b is set to 50% and the distortion_percentage is equal to 50%, FIG. 7C indicates that the contrast can be completely lost for large RGB components although the contrast can be preserved for small RGB components. In contrast, if b is set to 50% with the distortion_percentage equal to 0%, contrast can be preserved over all RGB components as shown in FIG. 7B, but the perceived brightness can be low. However, by clipping at the lower and upper ends of the RGB component range, both contrast and brightness can be preserved as shown in FIG. 7D.

Figure 8:
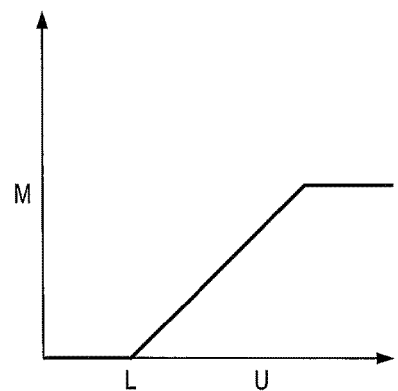
FIG. 8 illustrates an example of an RGB-component range where lower and upper ends of an RGB-component range are clipped to preserve contrast and brightness according to this disclosure.

FIG. 8 illustrates an example of a RGB-component range where lower and upper ends of a RGB-component range are clipped to preserve contrast and brightness according to this disclosure. The mapping t(x) can map all RGB-components below L (min_RGB_component) to 0. The mapping can also map all intensities above U (max_RGB_component) to M (mapped_max_RGB_component). The terms L, U and M can be determined at the transmitter so that t(x) can introduce minimal distortion and so that the slope of the line between L and U can be close to one. In some embodiments, the terms L, U, and M can be sent as metadata to the receiver. The RGB components can be adjusted according to t(x) as specified by the metadata, L, U and M. The backlight can then be scaled appropriately by the factor b=M/255.

In some embodiments, after the backlight values have been adjusted, the metadata can be modified, if necessary, to be consistent with the adjusted backlight values. For example, in the contrast_brightness_preserved method, the following metadata can be determined for each frame: U (max_RGB_component), L (min_RGB_component), and M (max_mapped_RGB_component). The backlight value for a frame can be scaled by b=M/255. These scaled backlight values can also be adjusted by the adjust_backlight( ) metadata. Furthermore, by denoting that the scaling factor associated with the adjusted backlight values as b' and computing M' such that M'=255*b', L' and U' can be re-computed so that the mapping t(x) defined by L', U' and M' can introduce minimal distortion and produce a slope at least close to unity. The terms L', U' and M' can constitute the modified metadata consistent with the adjusted backlight values.

In some embodiments, the transmitter can send the bitstream along with histograms for one or more frames to the receiver. These histograms can be compressed using a suitable lossless or lossy method. The receiver can account for control-frequency limitations and can compute appropriate metadata from the histograms. The receiver can apply the backlight adjustment function to avoid flicker from large backlight variations. Applying the backlight adjustment function by the receiver can avoid flicker and can adapt to control-frequency limitations without sending metadata through a feedback channel to the transmitter. However, this embodiment may not support real-time video streaming because the backlight adjustment function is applied over several successive frames.

Figure 9:
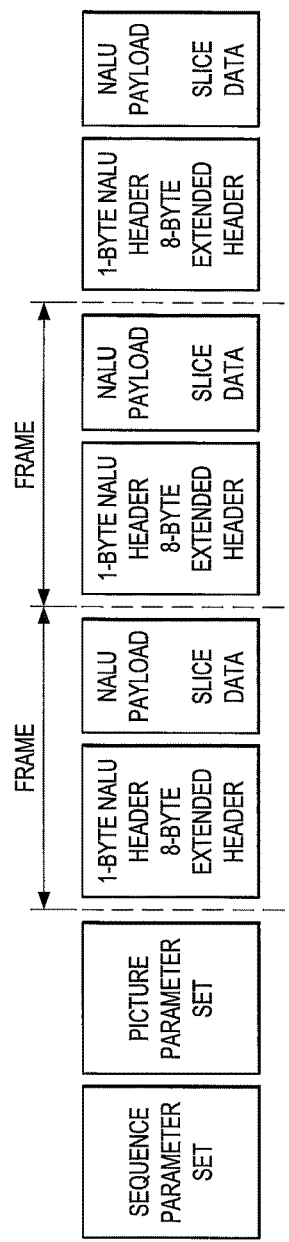
FIG. 9 illustrates an example of frame-level extended NALU header message encapsulation according to this disclosure.
Figure 10:
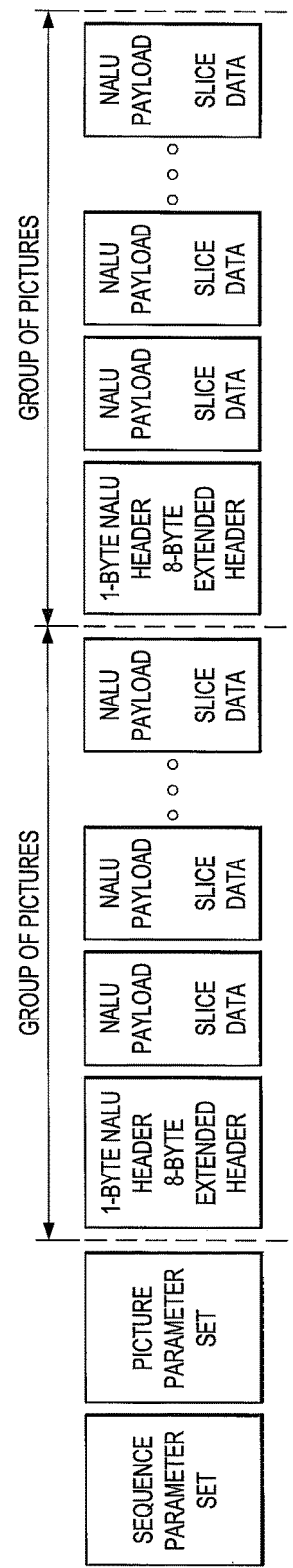
FIG. 10 illustrates an example of GOP-level extended NALU header message encapsulation according to this disclosure.

FIGS. 9 and 10 illustrate an example of frame-level extended NALU header message encapsulation and GOP-level extended NALU header message encapsulation according to this disclosure. In some embodiments, display adaptation can be implemented with systems that do not have a signaling mechanism to transmit data such as metadata from a receiver to a transmitter. However, before discussing further, various terms are defined as follows:

Reconstructed frames are the frames obtained after applying RGB color space conversion and cropping to the specific decoded picture or pictures for which display power-reduction metadata are applicable.

RGB color space is a color space based on the red, green and blue primaries.

RGB component is a single sample representing one of the three primary colors of the RGB color space.

Peak signal is the maximum permissible RGB component in a reconstructed frame. For 8-bit video, peak signal is 255.

Num_constant_backlight_voltage_time_intervals is the number of constant backlight/voltage time intervals for which metadata is provided in the bitstream.

Constant_backlight_voltage_time_interval[k] is the minimum time interval, such as in milliseconds, that must elapse before the backlight can be updated after the last backlight update. This can be the $k^{th}$ minimum time interval for which metadata is provided in the bitstream, where 0<=k<num_constant_backlight_voltage_time_intervals.

Num_max_variations is the number of maximum variations for which metadata can be provided in the bitstream.

Max_variation[j] is the maximal backlight change between two successive frames relative to the backlight value of the earlier frame. Max_variation can be in the range [0.001, 0.1] and can be normalized to one byte by rounding after multiplying by 2048. Max_variation can be the $j^{th}$ maximal backlight change for which metadata is provided in the bitstream, where 0<=j<num_max_variations.

num_quality_levels—the number of quality levels that are enabled by the metadata, excluding the NQLOP.

max_rgb_component[k] [j] [i]—for the kth constant_backlight_voltage_time_interval, jth max_variation and ith quality level, the maximum RGB component that will be retained in the frames, where 1<=i<=num_quality_levels. Note that max_rgb_component[k][j][0]=rgb_component_for_infinite_psnr[k][j].

scaled_frames[k][j][i]—for the kth constant_backlight_voltage_time_interval, jth max_variation and ith quality level, the frames obtained from the reconstructed frames by saturating to max_rgb_component[k][j][i] all RGB components that are greater than max_rgb_component[k][j][i], where 0<=i<=num_quality_levels.

rgb_component_for_infinite_psnr[k] [j]—for the kth constant_backlight_voltage_time_interval and jth max_variation, the largest among the red, green and blue components in the reconstructed frames. Therefore, scaled_frames[k][j][0] are identical to the reconstructed frames. The rgb_component_for_infinite_psnr[k][j] defines a No-Quality-Loss Operating Point (NQLOP) and consequently scaled_frames[k][j][0] will have a PSNR of infinity relative to the reconstructed frames.

scaled_psnr_rgb[k][j][i]—the PSNR of scaled_frames[k][j][i] relative to reconstructed frames. This PSNR is defined as follows:

$$\text{scaled\_psnr\_rgb}[k][j][i] =$$

$$\text{Clip}\left(\text{Round}\left(10\log_{10}\left(\frac{\text{peak\_signal}^2 \times \text{width} \times \text{height} \times N_{color} \times N_{frames}}{\sum_{n=1}^{N_{frames}} \sum_{c=1}^{N_{color}} \sum_{l=X_s+1}^{\text{peak\_signal}} N_{c,n}(l) \times (l - X_s)^2}\right)\right)\right)$$

for $0 < i <= \text{num\_quality\_levels}$, where,
width=width of a video frame,
height=height of a video frame,
$N_{color}$=number of color channels. For RGB colorspace, $N_{color}$=3,
$N_{frames}$=the number of frames in reconstructed frames.
$N_{c,n}(l)$=the number of RGB components that are set to 1 in the $n^{th}$ frame of color-channel c in reconstructed frames.
$X_s$=max_rgb_component [k] [j] [i],
Clip(x)=x, for x<256,
=255, otherwise.
Round(x)=x rounded mathematically to the nearest integer.
Note that scaled_psnr_rgb [k] [j] [0] is associated with the NQLOP. It is not transmitted, but understood to be mathematically infinite. backlight_scaling_factor [k][j][i]—max_rgb_component[k][j][i]/peak_signal, for the kth constant_backlight_voltage_time_interval, jth max_variation and ith quality level.
lower_bound[k][j]—if lower_bound[k][j] is greater than zero, then metadata for contrast enhancement is available at the lowest quality level, for the kth constant_backlight_voltage_time_interval and jth max_variation. If lower_bound[k][j]=0, then it is ignored because contrast enhancement metadata is unavailable.
upper_bound[k][j]—for the kth constant_backlight_voltage_time_interval and jth max_variation, if lower_bound[k][j] is greater than zero, then contrast enhancement can be performed as follows:

All RGB components of reconstructed frames that are less than or equal to lower_bound[k][j] are set to zero and All RGB components that are greater than or equal to upper_bound[k][j] are saturated to peak signal.

The RGB components in the range (lower_bound[k][j], upper_bound[k][j]) are mapped linearly onto the range (0, peak_signal)

For systems without a signaling mechanism from the receiver to the transmitter, based on provisional applications which this disclosure claims priority to, the MPEG Green Metadata Standard (ISO/IEC 23001-11 Draft International w14344) can define a message format for display-adaptation green metadata from the transmitter to the receiver. as illustrated below in Table 9A.

TABLE 9A

| | Size (bits) | Descriptor |
|---|---|---|
| num_constant_backlight_voltage_time_intervals | 2 | unsigned integer |
| num_max_variations | 2 | unsigned integer |
| num_quality_levels | 4 | unsigned integer |
| for (k = 0; k < num_constant_backlight_voltage_time_intervals;k++) | | |
|   constant_backlight_voltage_time_interval[k] | 16 | unsigned integer |
|   for (j = 0; j < num_max_variations; j++) | | |
|     max_variation[j] | 8 | unsigned integer |
|     lower_bound[k][j] | 8 | unsigned integer |
|     If (lower_bound[k][j] > 0) | | |
|       upper_bound[k][j] | 8 | unsigned integer |
|     rgb_component_for_infinite_psnr[k][j] | 8 | unsigned integer |
|     for (i = 1; i <= num_quality_levels; i++) | | |
|       max_rgb_component[k][j][i] | 8 | unsigned integer |
|       scaled_psnr_rgb[k][j][i] | 8 | unsigned integer |
| } | | |

In some embodiments, this format can be signaled using extended NALU syntax. In other embodiments, this format can be signaled using SEI message syntax or by any other signaling format.

In some embodiments, the transmitter can first transmit num_constant_backlight_voltage_time_intervals, num_max_variations, and num_quality_levels to the receiver. Next, the transmitter can send num_quality_levels pairs in the form (max_intensity, peak_signal_to_noise_ratio) to the receiver. DA metadata can be signaled by the transmitter in SEI messages or extended NALUs. DA metadata in an SEI message (or extended NALU) can be applicable to the system until the next SEI message (or extended NALU) arrives containing DA metadata. Using the format in Table 9A, the transmitter can send a message to the receiver. The DA metadata can be applicable to the presentation subsystem until the next message arrives containing DA metadata.

In some embodiments, display adaptation can be provided using contrast enhancement as discussed in the definition of upper_bound discussed herein. Although the contrast-enhancement metadata can be associated only with the lowest quality level, a practitioner skilled in the art will realized that such metadata can also be sent and utilized at other quality levels.

The preceding mode of operation assumes that a signaling mechanism from the receiver to the transmitter does not exist. However, if such a signaling mechanism does exist, the receiver can first use the following message format to signal information to the transmitter.

TABLE 9B

| | Size (bits) | Descriptor |
|---|---|---|
| constant_backlight_voltage_time_interval | 16 | unsigned integer |
| max_variation | 8 | unsigned integer |

The transmitter can then use the message format shown below to signal metadata to the receiver.

TABLE 9C

| | Size (bits) | Descriptor |
|---|---|---|
| num_quality_levels | 4 | unsigned integer |
| rgb_component_for_infinite_psnr | 8 | unsigned integer |
| for (i = 1; i <= num_quality_levels; i++) | | |
|     max_rgb_component[i] | 8 | unsigned integer |
|     scaled_psnr_rgb[i] | 8 | unsigned integer |
| } | | |

Using the message format in Table 9B, the receiver can first signal constant_backlight_voltage_time_interval and max_variation to the transmitter. The transmitter then can use the message format in Table 9C to send a message to the receiver. The DA metadata can be applicable to the presentation subsystem until the next message arrives containing DA metadata. In some embodiments, the receiver can initially transmit the metadata NumQualityLevels, which specifies the number of additional pairs (max_rgb_component[i], scaled_psnr_rgb[i]) that will be transmitted as metadata. At the transmitter, reconstructed frames is available within the encoder and scaled_frames[i] is estimated by saturating all RGB components of reconstructed frames to max_rgb_component[i]. The scaled_frames[i] thus obtained are what would be perceived at the display after the receiver scales the RGB components of reconstructed frames by peak signal/max_rgb_component[i] and then applies the backlight scaling factor, b=max_rgb_component[i]/peak signal to the LCD backlight. scaled_psnr_rgb[i] is computed at the transmitter using peak signal and by assuming that the noise is the difference between scaled_frames[i] and reconstructed frames accumulated over R, G and B components. The receiver examines the (num_quality_levels+1) pairs of metadata and selects the pair (max_rgb_component[iSelected], scaled_psnr_rgb[iSelected]) for which scaled_psnr_rgb[iSelected] is an acceptable quality level. Then, the receiver derives DA scaling factors from max_rgb_component[iSelected]. Finally, the display scales the RGB components of reconstructed frames by peak signal/max_rgb_component[iSelected] and scales the backlight or voltage level by max_rgb_component[iSelected]/peak signal. After backlight scaling, the displayed pixels are perceived as scaled_frames[iSelected]. The metadata clearly enables a tradeoff between quality (PSNR) and power reduction (backlight scaling factor).

In some embodiments, metadata as disclosed herein can enable the following power-saving protocol to be implemented in a user device. A user can specify a list of N acceptable PSNR quality levels $Q[1], \ldots, Q[N]$, where $Q[1]>Q[2]>\ldots>Q[N]$ and a list of Remaining Battery Life Levels (RBLLs) $RBLL[1], \ldots, RBLL[N]$ so that $RBLL[1]>RBLL[2]>\ldots>RBLL[N]$. For example, N=3 and $Q[1]$=40, $Q[2]$=35, $Q[3]$=25 with $RBLL[1]$=70%, $RBLL[2]$=40% and $RBLL[3]$=0%. When the user watches a video, the device can monitor the actual RBLL, denoted RBLLactual, of the device and can select RBLL[iSelected] so that $RBLL[iSelected-1]>RBLLactual>RBLL[iSelected]$, where $RBLL[0]$=100%. For each frame to be displayed, the device can examine the display-adaptation metadata and can select the pair or quartet indexed by jSelected for which $Q[iSelected-1]>scaled\_psnr\_rgb[jSelected]>Q[iSelected]$, where $Q[0]$=infinity. The metadata max_rgb_component[jSelected] can be used to determine display-adaptation scaling parameters. Thus, the device can implement a protocol that strikes a balance between perceived quality and power-saving. The balance can be tilted toward quality when the RBLL is high but can also shift toward power saving as the battery is depleted.

At low quality levels, contrast enhancement can significantly improve perceived visual quality, especially for bright content. To enhance contrast at the lowest quality level associated with the backlight scaling factor b=max_rgb_component[num_quality_levels]/peak signal the receiver first examines lower_bound. If it is greater than zero, then contrast enhancement metadata is available and the receiver stores upper_bound. The presentation subsystem performs contrast enhancement by setting the backlight scaling factor to b=max_rgb_component[num_quality_levels]/peak signal, and for each RGB component, x, of reconstructed frames, the following scaling to S(x) is performed:

S(x)=0 for x in [0, lower_bound];
S(x)=Peak_signal*(x_lower_bound)/(upper_bound−lower_bound) for x in (lower_bound, upper_bound); and
S(x)=Peak_signal for x in [upper_bound, Peak_signal].

The interval (lower_bound, upper_bound) can be mapped to the interval (0, Peak_signal). after applying the backlight scaling factor, b, to the display, the interval (lower_bound, upper_bound) is perceived visually as the interval (0, b*peak signal). Therefore, for RGB components within the interval (lower_bound, upper_bound), the perceived contrast enhancement is proportional to b*peak signal/(upper_bound−lower_bound). This expression simplifies to b/(upper_bound−lower_bound), because peak signal is a constant. For RGB components within the intervals [0, lower_bound] and [upper_bound, peak signal], all contrast is lost because these intervals are mapped to 0 and peak signal, respectively.

As shown above, the contrast can be maximized by determining the lower_bound parameter and the upper_bound parameter so that the majority of pixels lie within the interval between the lower_bound and upper_bound. Therefore, the optimal contrast-enhancement metadata can be computed by the following process at the transmitter. First, the transmitter can determine the backlight_scaling_factor corresponding to the lowest quality level as b=max_rgb_component[num_quality_levels−1]/Peak_signal. Then, the transmitter can invoke the following pseudo-code function get_contrast_metadata( ) to determine the lower_bound and upper_bound.

```
// Given R, G and B channels of Reconstructed_frames with pixel intensities x and
// cumulative distribution function, C(x), the function get_contrast_metadata( ) returns
// lower_bound and upper_bound.
[lower_bound, upper_bound] = get_contrast_metadata(C(x))
```

```
{
//    C(x):    Cumulative distribution function of pixel intensities in the R, G and B channels
//             of Reconstructed_frames.
max_enhancement = 0;
for (lower_bound = 0; lower_bound < Peak_signal; lower_bound++){
    for (upper_bound = lower_bound; upper_bound < peak_signal; upper_bound++){
            enhancement = (C(upper_bound)-C(lower_bound)) / (upper_bound - lower_bound)
            if (enhancement > max_enhancement) {
                max_enhancement = enhancement;
                best_lower_bound = lower_bound;
                best_upper_bound = upper_bound;
            }
        }
    }
}
return (best_lower_bound, best_upper_bound);
}
```

Although the metadata computed by get_contrast_metadata( ) is optimal for each frame, flicker artifacts may occur when the video is viewed due to large differences between lower_bound (or upper_bound) settings on successive video frames. To avoid such flicker, the lower_bound and upper_bound metadata should be smoothed temporally using the pseudocode function smooth_contrast_metadata( ) shown below.

```
// Given a video sequence with frameNum in [1,...,N], first smooth the lower bounds by
// applying the function recursively to all frames by issuing
//     smooth_contrast_metadata(LowerBounds,1),
//                 ...
//     smooth_contrast_metadata(LowerBounds,N)
// Then smooth the upper bounds by issuing
//     smooth_contrast_metadata(UpperBounds,1),
//                 ...
//     smooth_contrast_metadata(UpperBounds,N)
// where
//     LowerBounds: vector of lower_bound metadata for the N frames
//     UpperBounds: vector of upper_bound metadata for the N frames
void smooth_contrast_metadata(Vector, frameNum)
{
//     Vector: vector of metadata to be smoothed
//     frameNum: current frame number
    cur = Vector[frameNum]
    prev = Vector[frameNum - 1]
    if abs((cur - prev) / prev) > Threshold { // Check whether the metadata variation
                                              // between successive frames exceeds the
                                              // threshold.
        if (cur < prev) { // if the current frame's metadata is lower than the previous
                          // frame's metadata, then increase the current frame's metadata so
                          // that it reaches the acceptable threshold.
            Vector[frameNum] = prev * (1 - Threshold)
        }
        else { // increase the previous frame's metadata so that it reaches the acceptable
               // threshold. Then adjust the metadata for all preceding frames.
            Vector[frameNum - 1] = cur / (1 + Threshold)
            smooth_contrast_metadata(Vector, frameNum - 1)
        }
    }
}
```

The value of the threshold is display independent and in some embodiments can be set to about 0.015, which corresponds to a 1.5% metadata variation between successive frames.

If DA metadata were unavailable, then to implement DA, the display can estimate max_rgb_component[i] and immediately adjust the backlight (or voltage). This may not be possible in at least some practical implementations because there is a significant latency of "D" milliseconds between the instant when the backlight scaling control is applied and the instant when the backlight actually changes, in response to the control. If D is sufficiently large, then the backlight values may not be synchronized with the displayed frames and flickering can be visible. However, DA metadata can eliminate this flickering. Because the receiver can obtain the metadata in advance, the backlight scaling factor can be applied D milliseconds ahead of the video frame with which that scaling factor is associated. Therefore, by transmitting metadata, the latency issue can be solved and the backlight scaling factor can be set appropriately for each frame. Thus, flicker from backlight changes during video display can be avoided.

Besides eliminating flicker arising from backlight-control latency, DA metadata can also enable DA to be applied to displays in which the backlight (or voltage) may not be changed frequently. For such displays, once the backlight has been updated it can (and in at least some embodiments may have to) retain its value for a time interval that spans the duration of some number of successive frames. After the time interval has elapsed, the backlight can be updated again. DA metadata can allow the backlight to be set appropriately for the specified time interval so that maximal power reduction and minimal pixel saturation can occur. This appropriate backlight value can be determined by aggregating the intensity histograms for R, G and B channels in all successive frames in each time interval over which the backlight must remain constant. The aggregated histograms are then used to derive DA metadata. To enable this mode of operation, the receiver can signal to the transmitter constant_backlight_voltage_time_interval. It should be noted that constant_backlight_voltage_time_interval is the time interval over which the backlight (or voltage) must remain constant.

successive video frames. To avoid such flicker, a transmitter can use a function (such as the function disclosed in Table 12) to adjust the backlight setting of each frame. Specifically, if the relative backlight variation between a frame and its predecessor is larger than a threshold, then the backlight values of all preceding frames can be adjusted. This adjustment can be done at the transmitter after metadata has been computed, for example by using one of the methods described herein. Using this metadata, the transmitter can calculate the adjusted backlight value by assuming an arbitrary maximum backlight value, such as 255, and then applying the scaling factor derived from the metadata.

TABLE 12

```
// Given a video sequence with frameNum in [1,...,N], apply the function
// recursively to all frames by issuing
// adjust_backlight(Backlights,1,max_variation),
//                  ...
// adjust_backlight(Backlights,N,max_variation)
void adjust_backlight(Backlights, frameNum, max_variation)
{
//   Backlights: vector of backlight values
//   frameNum: current frame number
//   max_variation: maximum permissible backlight variation between two
//                  consecutive backlight values
    cur = Backlights[frameNum]
        prev = Backlights[frameNum − 1]
    if abs((cur − prev) / prev) > max_variation {
    // Check whether the backlight variation between successive frames exceeds
    // the threshold.
            if (cur < prev) {
            // if the current frame's backlight is lower than the previous frame's
            //    backlight, then increase the current frame's backlight so that it
            // reaches the acceptable threshold.
                backlights[frameNum] = prev * (1 − max_variation)
            }
            else {
            // increase the previous frame's backlight so that it reaches the acceptable
            // threshold.Then adjust the backlights for all preceding frames.
                backlights[frameNum − 1] = cur / (1 + max_variation)
                adjust_backlight(backlights, frameNum − 1, max_variation)
            }
    }
}
```

In some embodiments, such as on currently available displays, setting constant_backlight_voltage_time_interval equal to 100 milliseconds can be sufficient to prevent flicker. Therefore, setting num_constant_backlight_voltage_time_intervals=1 and constant_backlight_voltage_time_interval[0]=100 can be sufficient to prevent flicker arising from control-frequency limitations. However, a different display technology with constant_backlight_voltage_time_interval significantly different from 100 milliseconds can be contemplated. During the transition period from the current display technology to the different display technology, two types of displays will be widely used and it will be necessary to set num_constant_backlight_voltage_time_intervals=2, to support both display types. The preceding mode of operation assumes that a signaling mechanism from the receiver to the transmitter does not exist.

However, if such a signaling mechanism does exist, then the receiver can explicitly signal constant_backlight_voltage_time_interval to the transmitter. If the transmitter is additionally capable of re-computing the display adaptation metadata to be consistent with the signaled constant_backlight_voltage_time_interval, then the re-computed metadata can subsequently be provided to the receiver as disclosed herein such as in Table 9C.

In some embodiments, flicker can also occur due to a large difference between the backlight (or voltage) settings of In some embodiments, given that max_variation can be normalized to 255, the transmitter can apply the adjust_backlight( ) parameter with the specified max_variation threshold computed as the floating-point number (max_variation/2048). After the backlight values have been adjusted, the metadata can be modified, if necessary, to be consistent with the adjusted backlight values.

For a given display, large values of max_variation can induce more flicker but can also save more power. Therefore, the selected value of max_variation can be a compromise between flicker reduction and power saving. The max_variation metadata can at least help ensure that the receiver will not experience flicker because the backlights are adjusted specifically for the receiver's display.

On currently available displays, setting max_variation equal to 0.015*2048 can be sufficient to prevent flicker. Therefore, setting num_max_variations equal to one and max_variation equal to 0.015*2048 can be sufficient to prevent flicker arising from control-frequency limitations. However, in other embodiments, a new display technology with max_variation significantly different from 0.015*2048 may be invented. During the transition period from the current display technology to the new display technology, two types of displays may be widely used, and thus it may be necessary to set num_max_variations equal to two in order to support both display types. The preceding mode of operation assumes that a signaling mechanism from the receiver to the transmitter does not exist. However, if such a signaling mechanism does exist, the receiver can explicitly signal max_variation to the transmitter as disclosed herein. If the transmitter is additionally capable of re-computing the display adaptation metadata to be consistent with the signaled max_variation, the re-computed metadata can be provided to the receiver as disclosed herein.

Signaling using extended NALU syntax is illustrated in Table 10 shown below.

TABLE 10

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| if( nal_unit_type = = 14 \|\| nal_unit_type = = 20 ) { | | |
|   svc_extension_flag | All | u(1) |
|   if( svc_extension_flag ) | | |
|     nal_unit_header_svc_extension( ) /* specified in Annex G */ | All | |
|   Else | | |
|     nal_unit_header_mvc_extension( ) /* specified in Annex H */ | All | |
|   nalUnitHeaderBytes += 3 | | |
| } | | |
| if (nal_unit_type == 24 ){ | | |
| num_constant_backlight_voltage_time_intervals | All | f(2) |
| num_max_variations | All | f(2) |
| num_quality_levels | All | f(4) |
| for (k = 0; k < num_constant_backlight_voltage_time_intervals; k++) | | |
|   constant_backlight_voltage_time_interval[k] | All | f(16) |
|   for (j = 0; j < num_max_variations; j++) | | |
|     max_variation[j] | All | f(8) |
|     lower_bound[k][j] | All | f(8) |
|     If (lower_bound[k][j] > 0) | | |
|       upper_bound[k][j] | All | f(8) |
|       for(i = 0; i < num_quality_levels; i++) | | |
|         max_intensity[k][j][i] | All | f(8) |
|         peak_signal_to_noise_ratio[k][j][i] | All | f(8) |
| } | | |
| for( i = nalUnitHeaderBytes; i < NumBytesInNALunit; i++ ) { | | |
|   if( i + 2 < NumBytesInNALunit && next_bits( 24 ) = = 0x000003 ) { | | |
|     rbsp_byte[ NumBytesInRBSP++ ] | All | b(8) |
|     rbsp_byte[ NumBytesInRBSP++ ] | All | b(8) |
|     i += 2 | | |
|     emulation_prevention_three_byte /* equal to 0x03 */ | All | f(8) |
|   } else | | |
|     rbsp_byte[ NumBytesInRBSP++ ] | All | b(8) |
|   } | | |
| } | | |

Signaling using SEI message syntax is illustrated in Table 11 shown below.

TABLE 11

| display_adaptation( payloadSize ) { | C | Descriptor |
|---|---|---|
| num_constant_backlight_voltage_time_intervals | 5 | f(2) |
| num_max_variations | 5 | f(2) |
| num_quality_levels | 5 | f(4) |
| for (k = 0; k < num_constant_backlight_voltage_time_intervals; k++) | | |
|   constant_backlight_voltage_time_interval[k] | 5 | f(16) |
|   for (j = 0; j < num_max_variations; j++) | | |
|     max_variation[j] | 5 | f(8) |

TABLE 11-continued

| display_adaptation( payloadSize ) { | C | Descriptor |
|---|---|---|
|     lower_bound[k][j] | 5 | f(8) |
|     If (lower_bound[k][j] > 0) | | |
|       upper_bound[k][j] | 5 | f(8) |
|       for (i = 0; i < num_quality_levels; i++) | | |
|         max_intensity[k][j][i] | 5 | f(8) |
|         peak_signal_to_noise_ratio[k][j][i] | 5 | f(8) |
| } | | |

Display adaptation using an extended NALU header message based on a brightness preserved algorithm can require the maximum pixel value as the embedded information. However, this disclosure is not limited to such an implementation. For example, DA can cover any information derived at the encoder that can be embedded as the extended NALU header to help the display adaptation, such as both min and max pixel or even the histogram distribution.

As previously illustrated in FIG. 6, the percentage of pixels that are larger than Xs can be the complementary cumulative distribution or tail distribution. This statistic can be an explicit indicator of the perceived quality after applying DA with the scaling factor γ, which is dependent on Xs and hence dependent on the tail distribution. Therefore, instead of providing the DA metadata Xmax and S as above, the following histogram-based metadata that explicitly signals a quality level can be provided (as shown in Table 3):

Xs (such as one byte) can be the RGB component that will be scaled to 255; and

TailDistributionPercentage (such as seven bits) can be the percentage of pixels that will saturate if scaling is done using Xs.

It should be noted that the saturation-based metadata can be equivalent to the histogram-based metadata because the latter can be signaled using the former. In some embodiments, in order to accomplish this, S can be set equal to TailDistributionPercentage and normalized so that 256 represents 100%. Also, Xmax can be set equal to 256*Xs/(256−S). At the receiver, TailDistributionPercentage can be directly obtained from S. Furthermore, pixels can be scaled by (S/256)Xmax=(256−S)*256*Xs/[256*(256−S)]=Xs. Thus, both Xs and TailDistributionPercentage can be inferred from Xmax and S. However, the histogram-based metadata may be preferable because it explicitly signals a quality indicator in TailDistributionPercentage.

Histogram-based metadata can provide a mechanism to signal DA metadata for a single quality level associated with a single tail distribution. Therefore, a quality/power tradeoff can be provided by signaling several quality levels via their associated tail distributions and maximum intensities Xs.

The histogram_based metadata in Table 3 illustrates how metadata can provide a specified number of quality levels from the histogram distribution. The number of tail distributions can be specified as NumTails. For the $i^{th}$ tail distribution, max_Intensity[i] and TailDistributionPercentage[i] can be provided so that TailDistributionPercentage[i] percent of the pixels have intensities greater than max_Intensity [i]. TailDistributionPercentage[i] can indicate the percentage of pixels that will saturate if scaling is done by max_Intensity[i]. Therefore, by examining TailDistributionPercentage[i] for all i, the display can determine iSelected so that TailDistributionPercentage[iSelected] can provide the appropriate saturation percentage of pixels associated with an acceptable quality. The display can then scale the current reconstructed frame by 255/max_intensity[iSelected], as well as scale the backlight or voltage level by max_intensity [iSelected]/255. This metadata can enable a tradeoff between quality (percentage of saturated pixels) and power reduction (backlight scaling factor).

The histogram-based metadata can enable the following power-saving protocol to be implemented in a user device. The user can specify a list of N acceptable tail-distribution percentages T[1], ..., T[N], where T[1]<T[2]<...<T[N] and a list of Remaining Battery Life Levels (RBLLs) RBLL[1], ..., RBLL[N] so that RBLL[1]>RBLL[2]>...>RBLL[N]. For example, N=3 and T[1]=1%, T[2]=5%, T[3]=10% with RBLL[1]=70%, RBLL[2]=40% and RBLL[3]=0%. When the user watches a video, the device can monitor the actual RBLL, denoted by RBLLactual, of the device and select RBLL[iSelected] so that RBLL[iSelected−1]>RBLLactual>RBLL[iSelected], where RBLL[0]=100%. For each frame to be displayed, the device can examine the display-adaptation metadata and select the pair indexed by a jSelected parameter for which T[iSelected−1]<TailDistributionPercentage[jSelected]<T[iSelected], where T[0]=0%. The metadata max_intensity[jSelected] can be used to determine display-adaptation scaling parameters. Thus, the device can implement a protocol that strikes a balance between perceived quality and power-saving. The balance can be tilted toward quality when the RBLL is high but can also shift toward power saving as the battery is depleted.

Histogram-based metadata for a quality/power tradeoff as disclosed herein can use the tail distribution as a quality indicator. Although the tail distribution may not indicate the perceived quality level, the Peak Signal to Noise Ratio (PSNR) can also be a quality indicator. At the receiver, the PSNR can be computed from the tail distribution. Thus, both the tail distribution and the PSNR indicators can be equivalent. In some embodiments, the QUALITY_BASED metadata illustrated in Table 3 can be used as a way to choose between Quality of Experience (QoE) of the presentation and energy consumption.

In some embodiments, when display_scaling_method is set to QUALITY_CONTRAST_BRIGHTNESS_BASED, the receiver can transmit the metadata NumQualityLevels, which specifies the number of additional quartets (max_intensity[i], min_intensity[i], mapped_max_intensity[i], PeakSignalToNoiseRatio[i]) that will be transmitted as metadata. In the quartet, U (max_intensity[i]), L (min_intensity[i]), and M (mapped_max_intensity[i]) can be associated with the CONTRAST_BRIGHTNESS_BASED embodiment. The metadata PeakSignalToNoiseRatio[i] can indicate the PSNR computed after scaling the pixels in the image as specified by L, U, M and can apply the backlight scaling factor b=255/M. The PSNR is an objective quality measure. The receiver can examine the NumQualityLevels pairs of metadata and can select the quartet (max_intensity[iSelected], min_intensity[iSelected], mapped_max_intensity[iSelected], PeakSignalToNoiseRatio[iSelected]) for which PeakSignalToNoiseRatio[iSelected]) is an acceptable quality level. The receiver can derive display-adaptation scaling factors from max_intensity[iSelected], min_intensity[iSelected] and mapped_max_intensity[iSelected].

The QUALITY_CONTRAST_BRIGHTNESS_BASED embodiments can enable the following power-saving protocol to be implemented in a user device. A user can specify a list of N acceptable PSNR quality levels Q[1], ..., Q[N], where Q[1]>Q[2]>...>Q[N] and a list of Remaining Battery Life Levels (RBLLs) RBLL[1], ..., RBLL[N] so that RBLL[1]>RBLL[2]>...>RBLL[N]. For example, N=3 and Q[1]=40, Q[2]=35, Q[3]=25 with RBLL[1]=70%, RBLL[2]=40% and RBLL[3]=0%. When the user watches a video, the device can monitor the actual RBLL, denoted RBLLactual, of the device and select RBLL[iSelected] so that RBLL[iSelected−1]>RBLLactual>RBLL[iSelected], where RBLL[0]=100%. For each frame to be displayed, the device can examine the display adaptation metadata and select the pair or quartet indexed by jSelected for which Q[iSelected−1]>PeakSignalToNoiseRatio[jSelected]>Q[iSelected], where Q[0] is equal to infinity. In the QUALITY_CONTRAST_BRIGHTNESS_BASED embodiments, the metadata max_intensity[jSelected], min_intensity[Selected], mapped_max_intensity[jSelected] can be used to determine display-adaptation scaling parameters. Thus, the device can implement a protocol that strikes a balance between perceived quality and power-saving. The balance can be tilted toward quality when the RBLL is high but can also shift toward power saving as the battery is depleted.

The metadata disclosed herein can also be specified in one or more SEI messages.

Display Adaptation (DA) can achieve power savings by scaling up image RGB values while reducing the backlight or voltage proportionally. The decreased backlight or voltage can reduce display power consumption while still producing the same perceived display.

The metadata peak_signal_to_noise_ratio[i](PSNR(i)) can indicate the Peak Signal to Noise Ratio (PSNR) for the ith quality level. At the transmitter, Reconstructed_frames can be available within the encoder and Scaled_frames[i] and can be estimated by saturating all pixels in the R, G and B channels of Reconstructed_frames to max_intensity[i]. The Scaled_frames[i] thus obtained can be what would be perceived at the display after the receiver scales the pixels in the R, G, B channels of Reconstructed_frames by Peak_signal/max_intensity[i] and then can apply the backlight scaling factor, b=max_intensity[i]/Peak_signal to the LCD backlight. PSNR(i) can be computed at the transmitter by assuming that the peak signal is Peak_signal and that the noise is the difference between Scaled_frames[i] and Reconstructed_frames accumulated over R, G and B channels.

The receiver can examine the (num_quality_levels+1) pairs of metadata and select the pair (max_intensity[iSelected], peak_signal_to_noise_ratio[iSelected]) for which peak_signal_to_noise_ratio[iSelected] is an acceptable quality level. Then, the receiver can derive DA scaling factors from max_intensity[iSelected]. Finally, the display can scale the pixels in the R, G and B channels of Reconstructed_frames by Peak_signal/max_intensity[i] and scale the backlight or voltage level by max_intensity[i]/Peak_signal. After backlight scaling, the displayed pixels can be perceived as Scaled_frames[iSelected]. The metadata can enable a tradeoff between quality (PSNR) and power reduction (backlight scaling factor).

The following power-saving protocol can be implemented in a mobile device. The user can specify a list of N acceptable PSNR quality levels Q[1], ..., Q[N], where Q[1]>Q[2]>...>Q[N] and a list of Remaining Battery Life Levels (RBLLs) RBLL[1], ..., RBLL[N] so that RBLL[1]>RBLL[2]>...>RBLL[N]. For example, consider N=3 and Q[1]=40, Q[2]=35, Q[3]=25 with RBLL[1]=70%, RBLL[2]=40% and RBLL[3]=0%. When the user watches a video, the device can monitor the actual RBLL, denoted RBLLactual, of the device and selects RBLL[iSelected] so that RBLL[iSelected−1]>RBLLactual>RBLL[iSelected], where RBLL[0]=100%. For each frame to be displayed, the device can examine the display-adaptation metadata and select the pair indexed by jSelected for which Q[iSelected−1]>peak_signal_to_noise_ratio[jSelected]>Q[iSelected], where Q[0] can be equal to infinity. The metadata max_intensity[jSelected] can then be used to determine display-adaptation scaling parameters. Thus, the device can implement a protocol that strikes a balance between perceived quality and power-saving. The balance can be tilted toward quality when the RBLL is high but shifts toward power saving as the battery is depleted.

Figures 11, 12:
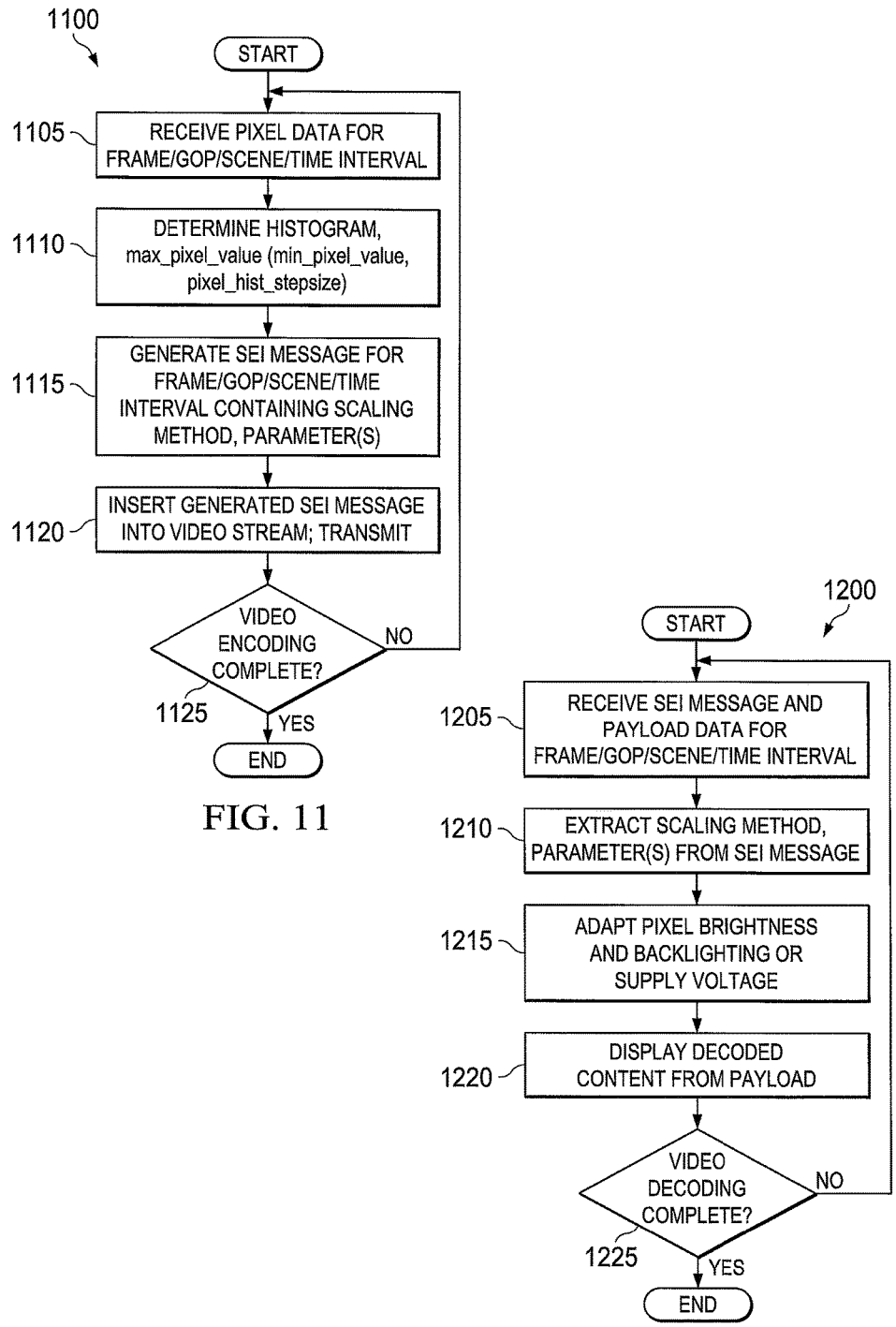
FIG. 11 is a high level flow diagram for a process of encoding video using SEI message insertion for dynamic, content-based display adaptation according to this disclosure.
FIG. 12 is a high level flow diagram for a process of video decoding and display based on SEI messages inserted for dynamic, content-based display adaptation according to this disclosure.

FIG. 11 is a high level flow diagram for a process 1100 of encoding video using SEI message insertion for dynamic, content-based display adaptation according to this disclosure. The process can be performed by the encoder controller within encoder 101. The same process can be employed for encoding video regardless of whether intended for delivery to a device supporting display adaptation since devices not supporting display adaptation can simply ignore display adaptation information embedded in the SEI messages. The process 1100 can begin with receiving pixel data for a frame, GOP, scene or time interval segment of the video being encoded at step 1105.

The histogram of pixel brightness can be determined for the video data of the segment being processed at step 1110. This can include a determination of at least a max_pixel_value and the corresponding peak signal-to-noise ratio. Optionally, other pairs of max_pixel_value and corresponding peak signal-to-noise ratio values can be determined along with a lower bound and an upper bound. An SEI message can be generated for the segment of video data being processed at step 1115. This could include using the scaling method and including the appropriate parameters. The SEI message can be inserted into the payload stream in association with the corresponding segment video data and the encoded video data can be transmitted at step 1120. If the video encoding is incomplete at step 1125, another iteration of the process can be performed for the pixel data for the next frame, GOP, scene or time interval segment of the video being encoded.

FIG. 12 is a high level flow diagram for a process 1200 of video decoding and display based on SEI messages inserted for dynamic, content-based display adaptation according to this disclosure. The process 1200 can be performed by the user device 105. The process 1200 can begin with receiving an SEI message and associated payload for a frame, GOP, scene or time interval segment of the video being decoded at step 1205. The scaling method and parameter(s) can be extracted from the SEI message at step 1210, and the pixel brightness and the supply voltage can be adapted (for an OLED display) or the pixel and backlighting brightness can be adapted (for an LCD display) based on the scaling method and parameter(s) at step 1215. The video content decoded from the payload for the corresponding frame, GOP, scene or time interval segment can be displayed with the adapted display settings at step 1220. If the video decoding is incomplete at step 1225, another iteration of the process can be performed for the next frame, GOP, scene or time interval segment of the video being decoded.

Display adaptation using an SEI message based on a brightness preserved algorithm can require the maximum pixel value to remain the same as in the embedded information. However, the principles disclosed here are not limited to only such an implementation. In other embodiments, any information derived from the video encoder can be embedded as part of the SEI message to help the display adaptation, such as both minimum and maximum pixel brightness values or even the histogram distribution.

The techniques disclosed in this patent document allow products, such as smartphones and tablets, to be much more power efficient while reducing the data costs, thus improving the user experience for mobile streaming applications.

While each process flow and/or signal sequence depicted in the figures and described above depicts a sequence of steps and/or signals, either in series or in tandem, unless explicitly stated or otherwise self-evident (such as that a signal cannot be received before being transmitted) no inference should be drawn from that sequence regarding specific order of performance, performance of steps or portions or transmission of signals thereof serially rather than concurrently or in an overlapping manner, or performance the steps or transmission of signals depicted exclusively without the occurrence of intervening or intermediate steps or signals. Moreover, those skilled in the art will recognize that complete processes and signal sequences are not illustrated or described. Instead, for simplicity and clarity, only so much of the respective processes and signal sequences as is unique to this disclosure or necessary for an understanding of this disclosure is depicted and described.

Although this disclosure has been described with exemplary embodiments, various changes and modifications can be suggested to one skilled in the art. It is intended that this disclosure encompass such changes and modifications as fall within the scope of the appended claims.

What is claimed is:

1. A method comprising:
    identifying an optimal backlight value for at least one quality level of a first video segment;
    transmitting data for the first video segment, the transmitted data for the first video segment comprising a first message containing a first set of display adaptation information, wherein the first set of display adaptation information comprises the optimal backlight value for the at least one quality level of the first video segment;
    identifying a backlight value for the at least one quality level of a second video segment;
    determining a maximum backlight value change threshold between successive video segments as a function of a previous backlight value; and
    applying temporal smoothing between the optimal backlight value for the at least one quality level of the first video segment and the backlight value for the at least one quality level of the second video segment based on the maximum backlight value change threshold, wherein applying the temporal smoothing comprises:
        determining that a difference between the optimal backlight value for the at least one quality level of the first video segment and the backlight value for the at least one quality level of the second video segment exceeds the maximum backlight value change threshold; and
        identifying an adjusted backlight value for the at least one quality level of the second video segment so that the difference between the optimal backlight value for the at least one quality level of the first video segment and the backlight value for the at least one quality level of the second video segment does not exceed the maximum backlight value change threshold.

2. The method of claim 1, further comprising:
    transmitting data for the second video segment, the transmitted data for the second video segment comprising a second message containing a second set of display adaptation information, wherein the second set of display adaptation information comprises the adjusted backlight value for the at least one quality level of the second video segment.

3. The method of claim 2, further comprising:
displaying the first and second video segments so that a perceived backlight flicker is not produced when a display transitions from the first video segment to the second video segment.

4. The method of claim 1, further comprising:
adjusting the backlight value for the at least one quality level of the second video segment based on a remaining battery life of a battery supplying power to a display.

5. The method of claim 1, wherein identifying the optimal backlight value for the at least one quality level of the first video segment comprises:
scaling the optimal backlight value for the at least one quality level of the first video segment to achieve maximum power consumption reduction without producing a perceived video quality degradation.

6. A user equipment (UE) for a communication system, the UE comprising:
a receiver configured to receive data of a first video segment, the data of the first video segment comprising a first message containing a first set of display adaptation information, wherein the first set of display adaptation information comprises an optimal backlight value for at least one quality value of the first video segment, wherein the optimal backlight value for the at least one quality value of the first video segment is determined based on a maximum backlight value change threshold between successive video segments, wherein the maximum backlight value change threshold is set as a function of a previous backlight value; and
a display configured to display the first video segment with the optimal backlight value for the at least one quality value of the first video segment,
wherein the receiver is further configured to receive data of a second video segment, the data of the second video segment comprising a second message containing a second set of display adaptation information,
wherein the second set of display adaptation information comprises an optimal backlight value for at least one quality value of the second video segment,
wherein the optimal backlight value for the at least one quality value of the second video segment is determined based on the maximum backlight value change threshold and an applied temporal smoothing between the optimal backlight value for the at least one quality value of the first video segment and the optimal backlight value for the at least one quality value of the second video segment, and
wherein the temporal smoothing is applied based on a difference determined between the optimal backlight value for the at least one quality value of the first video segment and the backlight value for the at least one quality value of the second video segment that exceeds the maximum backlight value change threshold, and an adjusted backlight value identified for the at least one quality value of the second video segment so that the difference between the optimal backlight value for the at least one quality value of the first video segment and the backlight value for the at least one quality value of the second video segment does not exceed the maximum backlight value change threshold.

7. The UE of claim 6, wherein the display is configured to display the second video segment with the optimal backlight value for the at least one quality value of the second video segment.

8. The UE of claim 6, wherein the first set of display adaptation information and second set of display adaptation information comprise at least one of: a maximum pixel brightness value, a minimum pixel brightness value, and a pixel brightness histogram step size value.

9. The UE of claim 7, the display is further configured to present the first and second video segments so that a perceived backlight flicker is not produced when the display transitions from the first video segment to the second video segment.

10. The UE of claim 6, wherein the UE further comprises at least one processor configured to adjust the backlight value for the at least one quality value of the second video segment based on a remaining battery life of a battery supplying power to the display.

11. The UE of claim 6, wherein the optimal backlight value for the at least one quality value of the first video segment is determined by scaling the optimal backlight value for the at least one quality value of the first video segment to achieve maximum power consumption reduction without producing a perceived video quality degradation.

12. A method comprising:
identifying a dynamic RGB component range for a lowest quality level of a first video segment;
identifying a lower bound and an upper bound within the dynamic RGB component range for the lowest quality level of the first video segment;
transmitting data for the first video segment, the transmitted data for the first video segment comprising a first message containing a first set of display adaptation information, wherein the first set of display adaptation information comprises the lower bound and the upper bound within the dynamic RGB component range for the lowest quality level of the first video segment;
identifying a dynamic RGB component range for the lowest quality level of a second video segment;
identifying a lower bound and an upper bound within the dynamic RGB component range for the lowest quality level of the second video segment;
determining a maximum bound change threshold between successive video segments as a function of a previous backlight value; and
applying temporal smoothing on at least one of the lower bound of the second video segment and the upper bound of the second video segment based on the maximum bound change threshold.

13. The method of claim 12, wherein applying the temporal smoothing comprises:
determining that at least one of:
a difference between the lower bound of the first video segment and the lower bound of the second video segment exceeds the maximum bound change threshold; and
a difference between the upper bound of the first video segment and the upper bound of the second video segment exceeds the maximum bound change threshold; and
identifying at least one of an adjusted upper bound of the second video segment and an adjusted lower bound of the second video segment so that neither difference exceeds the maximum bound change threshold.

14. The method of claim 13, further comprising:
transmitting data for the second video segment, the transmitted data for the second video segment comprising a second message containing a second set of display adaptation information, wherein the second set of display adaptation information comprises at least one of the adjusted lower bound and the adjusted upper bound for the lowest quality level of the second video segment.

15. The method of claim 12, further comprising:
displaying the first and second video segments so that a perceived contrast flicker is not produced when a display transitions from the first video segment to the second video segment.

16. The method of claim 12, further comprising:
adjusting at least one of the lower bound and the upper bound of the second video segment based on a remaining battery life of a battery supplying power to a display.

17. The method of claim 12, further comprising:
eliminating RGB components lower than the lower bound of the first video segment and eliminating RGB components above the upper bound of the first video segment in order preserver contrast and brightness of the first video segment.

18. A system comprising:
a transmitter configured to transmit data for a first video segment, the data for the first video segment comprising a first message containing a first set of display adaptation information, wherein the first set of display adaptation information comprises a lower bound and an upper bound within a dynamic RGB component range for a lowest quality level of the first video segment; and
at least one processor configured to:
identify the dynamic RGB component range for the lowest quality level of the first video segment;
identify the lower bound and the upper bound within the dynamic RGB component range for the lowest quality level of the first video segment;
identify a dynamic RGB component range for the lowest quality level of a second video segment;
identify a lower bound and an upper bound within the dynamic RGB component range for the lowest quality level of the second video segment;

determine a maximum bound change threshold between successive video segments as a function of a previous backlight value; and
apply temporal smoothing on at least one of the lower bound of the second video segment and the upper bound of the second video segment based on the maximum bound change threshold.

19. The system of claim 18, wherein the transmitter is further configured to transmit data for the second video segment, the data for the second video segment comprising a second message containing a second set of display adaptation information, wherein the second set of display adaptation information comprises at least one of an adjusted lower bound and an adjusted upper bound for the lowest quality level of the second video segment.

20. The system of claim 19, wherein the first set of display adaptation information and second set of display adaptation information comprise at least one of: a maximum pixel brightness value, a minimum pixel brightness value, and a pixel brightness histogram step size value.

21. The system of claim 18, further comprising:
a display configured to present the first and second video segments so that a perceived contrast flicker is not produced when the display transitions from the first video segment to the second video segment.

22. The system of claim 18, wherein the at least one processor is configured to adjust at least one of the lower bound and the upper bound of the second video segment based on a remaining battery life of a battery supplying power to a display.

23. The system of claim 18, wherein the at least one processor is configured to eliminate RGB components lower than the lower bound of the first video segment and eliminate RGB components above the upper bound of the first video segment in order preserver contrast and brightness of the first video segment.

* * * * *